US008076411B2

(12) United States Patent
Maton et al.

(10) Patent No.: US 8,076,411 B2
(45) Date of Patent: *Dec. 13, 2011

(54) ORGANOSILOXANE COMPOSITIONS

(75) Inventors: Isabelle Maton, Braine L'alleud (BE); Giuseppina Lavinaro, Trivieres (BE); Jean Willieme, Quaregnon (BE); Thierry Dessilly, Blaugies (BE); Tommy Detemmerman, Wezembeek-Oppem (BE); Robert Drake, Penarth (GB)

(73) Assignee: Dow Corning Corporation, Midland, MI (US)

( * ) Notice: Subject to any disclaimer, the term of this patent is extended or adjusted under 35 U.S.C. 154(b) by 294 days.

This patent is subject to a terminal disclaimer.

(21) Appl. No.: 11/910,590

(22) PCT Filed: Apr. 3, 2006

(86) PCT No.: PCT/GB2006/050075
§ 371 (c)(1), (2), (4) Date: May 20, 2008

(87) PCT Pub. No.: WO2006/106362
PCT Pub. Date: Oct. 12, 2006

(65) Prior Publication Data
US 2009/0215944 A1 Aug. 27, 2009

(30) Foreign Application Priority Data

Apr. 6, 2005 (GB) .................................. 0506939.8
Aug. 6, 2005 (GB) .................................. 0516239.1

(51) Int. Cl.
*C08L 83/04* (2006.01)

(52) U.S. Cl. ............. 524/837; 528/13; 528/18; 528/21; 528/23; 524/792; 524/793; 524/730; 524/706

(58) Field of Classification Search .................. None
See application file for complete search history.

(56) References Cited

U.S. PATENT DOCUMENTS

| | | | |
|---|---|---|---|
| 3,220,879 A | 11/1965 | Stare et al. | |
| 3,308,203 A * | 3/1967 | Metevia et al. | ............. 525/477 |
| 3,341,486 A | 9/1967 | Murphy | |
| 3,378,520 A | 4/1968 | Noll et al. | |
| 3,419,593 A | 12/1968 | Willing | |
| 3,427,270 A | 2/1969 | Northrup | |
| 3,433,765 A | 3/1969 | Geipel | |
| 3,480,583 A | 11/1969 | Bailey et al. | |
| 3,715,334 A | 2/1973 | Karstedt | |
| 3,814,730 A | 6/1974 | Karstedt | |
| 3,817,894 A | 6/1974 | Butler et al. | |
| 3,839,388 A | 10/1974 | Nitzsche et al. | |
| 3,923,705 A | 12/1975 | Smith | |
| 3,957,842 A | 5/1976 | Prokai et al. | |
| 3,962,160 A | 6/1976 | Beers et al. | |
| 3,971,751 A | 7/1976 | Isayama et al. | |
| 4,020,044 A | 4/1977 | Crossan et al. | |
| 4,022,941 A | 5/1977 | Prokai et al. | |
| 4,071,498 A | 1/1978 | Frye et al. | |
| 4,147,855 A | 4/1979 | Schiller et al. | |
| 4,240,450 A | 12/1980 | Grollier et al. | |
| 4,247,445 A | 1/1981 | Smith, Jr. et al. | |
| 4,312,801 A | 1/1982 | Bodin et al. | |
| 4,357,438 A | 11/1982 | Sattlegger et al. | |
| 4,358,558 A | 11/1982 | Shimizu | |
| 4,433,096 A | 2/1984 | Bokerman et al. | |
| 4,472,563 A | 9/1984 | Chandra et al. | |
| 4,486,567 A * | 12/1984 | Bowman et al. | ............. 524/863 |
| 4,515,834 A | 5/1985 | Fukayama et al. | |
| 4,564,693 A | 1/1986 | Riederer | |
| 4,568,701 A | 2/1986 | Hopkins, Jr. | |
| 4,568,707 A | 2/1986 | Voigt et al. | |
| 4,599,438 A | 7/1986 | White et al. | |
| 4,614,760 A | 9/1986 | Homan et al. | |
| 4,655,767 A | 4/1987 | Woodard et al. | |
| 4,701,490 A | 10/1987 | Burkhardt et al. | |
| 4,824,891 A | 4/1989 | Laurent et al. | |
| 4,902,499 A | 2/1990 | Bolich, Jr. et al. | |
| 4,902,575 A | 2/1990 | Yukimoto et al. | |
| 4,906,707 A | 3/1990 | Yukimoto et al. | |
| 4,918,121 A | 4/1990 | Peccoux et al. | |
| 4,965,311 A | 10/1990 | Hirose et al. | |
| 4,968,766 A | 11/1990 | Kendziorski | |
| 4,985,476 A | 1/1991 | Endres et al. | |
| 4,990,555 A | 2/1991 | Trego | |
| 5,000,029 A * | 3/1991 | Laurent et al. | ............. 72/466.8 |

(Continued)

FOREIGN PATENT DOCUMENTS

CN 1346384 4/2002

(Continued)

OTHER PUBLICATIONS

English language abstract for DE 3217516 extracted from espacenet.com database dated Jul. 15, 2008. English language abstract for DE 3342026 extracted from espacenet.com database dated Jul. 15, 2008.
English language abstract for DE 3342027 extracted from espacenet.com database dated Jul. 15, 2008.
English language abstract for EP 0043501 extracted from delphion.com database dated Jul. 22, 2008.
English language abstract for EP 0093918 extracted from espacenet.com database dated Jul. 18, 2008.
English language abstract for EP 0215470 extracted from delphion.com database dated Jul. 22, 2008.
English language abstract for EP 0801101 extracted from espacenet.com database dated Jul. 15, 2008.
English language abstract for EP 0807667 extracted from espacenet.com database dated Jul. 15, 2008.

(Continued)

Primary Examiner — Marc Zimmer
(74) Attorney, Agent, or Firm — Howard & Howard Attorneys PLLC

(57) ABSTRACT

A method of making a diluted polysiloxane containing polymer comprising the steps of:
  i) Preparing a polysiloxane containing polymer by the polycondensation of siloxane containing monomers and/or oligomers which comprise condensable groups in the presence of an organopolysiloxane and/or an organic based diluent material, a suitable catalyst and optionally an end-blocking agent; and
  ii) Where required quenching the polymerization process; wherein the diluent material is substantially retained within the resulting diluted organopolysiloxane.

27 Claims, No Drawings

U.S. PATENT DOCUMENTS

| | | | |
|---|---|---|---|
| 5,043,012 A | 8/1991 | Shinohara et al. | |
| 5,063,270 A | 11/1991 | Yukimoto et al. | |
| 5,175,325 A | 12/1992 | Brown et al. | |
| 5,210,129 A | 5/1993 | de la Croi Habimana et al. | |
| 5,286,787 A | 2/1994 | Podola et al. | |
| 5,300,612 A | 4/1994 | Saruyama | |
| 5,350,824 A | 9/1994 | Kobayashi | |
| 5,534,588 A | 7/1996 | Knepper et al. | |
| 5,569,750 A | 10/1996 | Knepper et al. | |
| 5,863,976 A | 1/1999 | Schneider | |
| 5,914,382 A | 6/1999 | Friebe et al. | |
| 5,973,060 A | 10/1999 | Ozaki et al. | |
| 5,981,680 A | 11/1999 | Petroff et al. | |
| 6,451,440 B2 | 9/2002 | Atwood et al. | |
| 6,545,104 B1 | 4/2003 | Mueller et al. | |
| 6,599,633 B1 | 7/2003 | Wolf et al. | |
| 6,833,407 B1 | 12/2004 | Ahmed et al. | |
| 7,605,203 B2 | 10/2009 | Feng et al. | |
| 7,754,800 B2 * | 7/2010 | Maton et al. | 524/425 |
| 2003/0105260 A1 | 6/2003 | Cook et al. | |
| 2004/0122199 A1 | 6/2004 | Scheim et al. | |
| 2005/0054765 A1 | 3/2005 | Putzer | |
| 2008/0312365 A1 | 12/2008 | Maton et al. | |
| 2008/0312366 A1 | 12/2008 | Maton et al. | |
| 2008/0312367 A1 | 12/2008 | Maton et al. | |
| 2009/0215944 A1 | 8/2009 | Maton et al. | |
| 2009/0234052 A1 | 9/2009 | Maton et al. | |

FOREIGN PATENT DOCUMENTS

| | | |
|---|---|---|
| CN | 1346384 A | 4/2002 |
| DE | 2364856 A1 | 12/1973 |
| DE | 2802170 A1 | 1/1978 |
| DE | 2653499 | 6/1978 |
| DE | 3217516 A1 | 11/1983 |
| DE | 3342027 C1 | 5/1985 |
| DE | 3342026 A1 | 7/1985 |
| EP | 0043501 A1 | 1/1982 |
| EP | 0093918 A1 | 11/1983 |
| EP | 0154922 | 5/1985 |
| EP | 0196565 A1 | 10/1986 |
| EP | 0215470 A2 | 3/1987 |
| EP | 0277740 A2 | 8/1988 |
| EP | 0315333 A2 | 5/1989 |
| EP | 0378420 A2 | 7/1990 |
| EP | 0382365 A2 | 8/1990 |
| EP | 0397036 A2 | 11/1990 |
| EP | 0537785 A1 | 4/1993 |
| EP | 0651022 A2 | 5/1995 |
| EP | 0679674 A2 | 11/1995 |
| EP | 0801101 A1 | 10/1997 |
| EP | 0802233 A2 | 10/1997 |
| EP | 0807667 A2 | 11/1997 |
| EP | 0842974 A1 | 5/1998 |
| EP | 0860459 A2 | 8/1998 |
| EP | 0860461 A2 | 8/1998 |
| EP | 0885921 A2 | 12/1998 |
| EP | 0909778 A1 | 4/1999 |
| EP | 0982346 A1 | 3/2000 |
| EP | 1008598 A2 | 6/2000 |
| EP | 1041119 A2 | 10/2000 |
| EP | 1138715 A1 | 10/2001 |
| EP | 1252252 | 10/2002 |
| EP | 1368426 | 12/2003 |
| EP | 1254192 B1 | 8/2004 |
| EP | 1481038 | 12/2004 |
| GB | 895091 | 5/1962 |
| GB | 918823 | 2/1963 |
| GB | 1289526 | 9/1972 |
| GB | 1490240 | 10/1977 |
| GB | 2012789 A | 8/1979 |
| GB | 2041955 A | 9/1980 |
| GB | 2252975 A | 8/1992 |
| JP | 59100136 A | 6/1984 |
| JP | 59176326 | 10/1984 |
| JP | 63083167 | 4/1988 |
| JP | 01152131 | 6/1989 |
| JP | 01152156 | 6/1989 |
| JP | 05178996 | 7/1993 |
| JP | 06016813 | 1/1994 |
| JP | 9506667 | 6/1997 |
| JP | 2000026726 | 1/2000 |
| JP | 2000103857 | 4/2000 |
| JP | 2003252996 | 10/2003 |
| WO | WO9532245 A1 | 11/1995 |
| WO | WO 99/06473 A1 | 2/1999 |
| WO | WO 99/65979 A1 | 12/1999 |
| WO | WO 99/66012 A2 | 12/1999 |
| WO | WO 00/27910 A1 | 5/2000 |
| WO | 0061672 A1 | 10/2000 |
| WO | WO 01/53425 A2 | 7/2001 |
| WO | WO 01/79330 A1 | 10/2001 |
| WO | WO 02/062893 A2 | 8/2002 |
| WO | WO 03/006530 A1 | 1/2003 |
| WO | WO 03/074634 A2 | 9/2003 |
| WO | WO 2005/103117 A1 | 11/2005 |

OTHER PUBLICATIONS

English language abstract for EP 0885921 extracted from espacenet.com database dated Jul. 18, 2008.

PCT International Search Report for PCT/GB2006/050074, Aug. 2, 2006, 4 pages.

PCT International Search Report for PCT/GB2006/050072, Jul. 21, 2006, 4 pages.

PCT International Search Report for PCT/GB2006/050073, Aug. 2, 2006, 5 pages.

PCT International Search Report for PCT/EB2006/061285, Jul. 28, 2006, 4 pages.

PCT International Search Report for PCT/US2006/011986, Aug. 2, 2006, 3 pages.

Article: Kirk-Othmer, "Silicone Compounds", Encyclopedia of Chemical Technology, 4th edition, vol. #22, 1997, pp. 107-109.

A.W. Karlin, et al., Uber Syntheseverfahren von Siloxanelastomeren, 5 pages.

Aart Molenberg, et al., A Fast Catalyst System for the Ring-Opening Polymerization of Cyclosiloxanes, Macromol, Rapid Commun. 16, 449-453 (1995), 5 pages.

Reinhard Schwesinger, Extremely Strong, Uncharged Auxiliary Bases; Monomeric and Polymer-Supported Polyaminophosphazenes (P2-P5), 1996, 27 pages.

Mark E. Van Dyke, et al., Reaction Kinetics for the Anionic Ring-Opening Polymerization of Tetraphenyletramethylcyclo-Tetrasiloxane Using a Fast Catalyst System, 2 pages.

English language abstract for CN 1346384 extracted from espacenet.com database, dated Jul. 16, 2010, 22 pages.

Dictionary of Chemistry and Chemical Technology, 2 pages (title page and p. 1250); Author: Hua xue hua gong da ci dian bian wei hui.; Hua xue gong ye chu ban she. Ci shu bian ji bu Publisher: Hua xue gong ye chu ban she, 2003 ISBN: 7502526110 9787502526115.

English language translation for JP2003252996 extracted from PAJ database on Jun. 13, 2011, 13 pages.

English language translation for JP 2000026726 extracted from PAJ database on Jun. 13, 2011, 27 pages.

English language abstract for JP 63083167 extracted from PAJ database on Jun. 13, 2011, 6 pages.

English language translation for JP 2000103857 extracted from PAJ database on Jun. 13, 2011, 22 pages.

English language abstract for JP 01152156 extracted from PAJ database on Jun. 13, 2011, 14 pages.

English language translation for JP 05178996 extracted from PAJ database on Jun. 13, 2011, 17 pages.

English language abstract for JP 9506667 extracted from espacenet database on Jun. 13, 2011, 31 pages.

English language abstract for JP 01152131 extracted from PAJ database on Jun. 13, 2011, 7 pages.

English language translation for JP 06016813 extracted from PAJ database on Jun. 13, 2011, 13 pages.

English language abstract for JP 59176326 extracted from espacenet database on Jun. 13, 2011, 13 pages.

International Search Report for PCT/GB2006/050075, dated Jul. 28, 2006, 3 pages.
English language abstract not available for EP0154922. However, see English language equivalent US4568707.

English language abstract not available for DE2653499. However, see English language equivalent US4147855.

* cited by examiner ure compositions used as room temperature cure sealants, to include additives which serve to "extend" and/or "plasticise" the silicone sealant composition by blending the or each extending compound (henceforth referred to as an "extender") and/or plasticising compound (henceforth referred to as a "plasticiser") with the pre-prepared polymer and other ingredients of the composition.

ORGANOSILOXANE COMPOSITIONS

RELATED APPLICATIONS

This application claims priority to and all the advantages of International Patent Application No. PCT/GB2006/050075, filed on Apr. 3, 2006, which claims priority to Great Britain Patent Application Nos. GB 0506939.8 and GB 0516239.1, filed on Apr. 6, 2005 and Aug. 6, 2005, respectively.

This invention is concerned with the condensation polymerisation of organosiloxane polymers in the presence of a diluent, compositions containing the resulting polymers and applications therefor, such as sealing, rubber, personal care and adhesion applications.

The rheological properties of uncured polymers are primarily a function of their viscosities. In general the lower the viscosity of a polymer the higher the extrusion rate of uncured compositions which contain the polymer. The viscosity of an uncured polymer is directly related to the molecular weight of the polymer and the length of the polymer chain, usually defined as the degree of polymerisation (dp). The viscosity of the uncured polymer is also a major influence on several of the physical properties of compositions incorporating the polymer such as, for example, sealant compositions, when such compositions are subsequently cured.

Organosiloxane compositions which cure to elastomeric solids are well known and such compositions can be produced to cure at either room temperature in the presence of moisture or with application of heat. Typically those compositions which cure at room temperature in the presence of moisture are obtained by mixing a polydiorganosiloxane based polymer having reactive terminal groups, with a suitable silane (or siloxane) based cross-linking agent in the presence of one or more fillers and a curing catalyst. These compositions are typically either prepared in the form of one-part compositions curable upon exposure to atmospheric moisture at room temperature or two part compositions curable upon mixing at room temperature and pressure.

One important application of the above-described curable compositions is their use as sealants. In use as a sealant, it is important that the composition has a blend of properties which render it capable of being applied as a paste to a joint between substrate surfaces where it can be worked, prior to curing, to provide a smooth surfaced mass which will remain in its allotted position until it has cured into an elastomeric body adherent to the adjacent substrate surfaces. Typically sealant compositions are designed to cure quickly enough to provide a sound seal within several hours but at a speed enabling the applied material to be tooled into a desired configuration shortly after application. The resulting cured sealant is generally formulated to have a strength and elasticity appropriate for the particular joint concerned.

The introduction of an inorganic filler into an elastomeric composition containing an organopolysiloxane containing polymer is often required to obtain useful tear, durometer, elongation and modulus at 100% elongation properties. The rheological properties of an uncured elastomer are dependent on filler properties (when a filler is present in the composition) such as filler concentration and structure and the degree of polymer-filler interaction as well as the viscosity of the polymer. In general the lower the viscosity of the uncured organopolysiloxane containing composition, optionally containing filler, the higher the extrusion rate of the uncured composition. As a result applications requiring high extrusion rates such as uncured sealants, which in use, are generally extruded manually using a sealant gun or the like, need to typically be of relatively low viscosity (e.g. <100 000 mPa·s at 25° C.) to ensure suitable composition extrusion rates for manual end uses.

The physical properties of the resulting cured composition affected include elongation and modulus at 100% elongation, both of which are particularly important for sealants used in for example expansion joints in the construction and transportation industries, where the need for sealants with low modulus and high elongation are essential.

Hence, whilst it is known that increasing the molecular weight of a polymer would improve some physical properties of a sealant typically the maximum viscosity used in current formulations are in practice no greater than about 150 000 mPa·s at 25° C. Whilst polymers having viscosities of up to 1,000,000 mPa·s at 25° C. have been discussed in the prior art the use of polymers having such viscosities has been practically unmanageable. Hence, whilst it is known increasing the molecular weight of the polymer would improve the some properties of the sealant typically the maximum viscosity used in current formulations are in practice no greater than about 150 000 mPa·s at 25° C.

It has become common practice in the formulation of silicone based compositions used as room temperature cure sealants, to include additives which serve to "extend" and/or "plasticise" the silicone sealant composition by blending the or each extending compound (henceforth referred to as an "extender") and/or plasticising compound (henceforth referred to as a "plasticiser") with the pre-prepared polymer and other ingredients of the composition.

An extender (sometimes also referred to as a process aid or secondary plasticiser) is used to dilute the sealant composition and basically make the sealant more economically competitive without substantially negatively affecting the properties of the sealant formulation. The introduction of one or more extenders into a silicone sealant composition not only reduces the overall cost of the product but can also affect the properties of resulting uncured and/or cured silicone sealants. The addition of extenders can, to a degree, positively effect the rheology, adhesion and clarity properties of a silicone sealant and can cause an increase in elongation at break and a reduction in hardness of the cured product both of which can significantly enhance the lifetime of the cured sealant provided the extender is not lost from the cured sealant by, for example, evaporation or exudation.

A plasticiser (otherwise referred to as a primary plasticiser) is added to a polymer composition to provide properties within the final polymer based product to increase the flexibility and toughness of the final polymer composition. This is generally achieved by reduction of the glass transition temperature ($T_g$) of the cured polymer composition thereby generally, in the case of sealants for example, enhancing the elasticity of the sealant which in turn enables movement capabilities in a joint formed by a silicone sealant with a significant decrease in the likelihood of fracture of the bond formed between sealant and substrate when a sealant is applied thereto and cured. Plasticisers are typically used to also reduce the modulus of the sealant formulation. Plasticisers may reduce the overall unit cost of a sealant but that is not their main intended use and indeed some plasticisers are expensive and could increase the unit cost of a sealant formulation in which they are used. Plasticisers tend to be generally less volatile than extenders and are typically introduced into the polymer composition in the form of liquids or low melting point solids (which become miscible liquids during processing. Typically, for silicone based composition plasticisers are organopolysiloxanes which are unreactive with the siloxane polymer of the composition, such as polydimethylsiloxane having terminal triorganosiloxy groups wherein the organic substituents are, for example, methyl, vinyl or phenyl or combinations of these groups. Such polydimethylsiloxanes normally have a viscosity of from about 5 to about 100,000 mPa·s. Compatible organic plasticisers may additionally be used, examples include dialkyl phthalates wherein the alkyl group may be linear and/or branched and contains from six to 20 carbon atoms such as dioctyl, dihexyl, dinonyl, didecyl, diallanyl and other phthalates; adipate, azelate, oleate and sebacate esters, polyols such as ethylene glycol and its derivatives, organic phosphates such as tricresyl phosphate and/or triphenyl phosphates, castor oil, tung oil, fatty acids and/or esters of fatty acids.

Typically plasticisers are more compatible with polymer compositions than extenders and tend to be significantly less volatile and as such are significantly more likely to remain at high levels within the polymer matrix after curing.

Extenders need to be both sufficiently compatible with the remainder of the composition and as non-volatile as possible at the temperature at which the resulting cured elastomeric solid is to be maintained (e.g. room temperature). However it has been found that whilst some proposed extenders are effective during storage, at the time of application of the sealant and at least for a time thereafter, there are several well known problems regarding their use. These include:—
(i) UV stability—the discolouring of cured sealants containing extenders upon prolonged exposure to UV light;
(ii) Poor compatibility with the polymer composition (e.g. a sealant composition) leading to their exuding from the sealant over time which negatively effects the physical and aesthetic properties and lifetime of the cured product e.g. sealant; and
(iii) Staining of the surrounding substrates onto which the extenders exude from the composition.

As previously mentioned the process used in the industry, for introducing extenders and/or plasticisers into a polymer composition such as a sealant composition, consists of merely mixing all the pre-prepared ingredients, e.g. polymer, crosslinker, catalyst, filler and the or each extender and/or plasticiser together in appropriate amounts and orders of addition. Compatibility of organic extenders and/or plasticisers with the other ingredients in an organopolysiloxane based polymer composition, is a significantly greater problem than with respect to organic based polymers, silicone polymers into which the extenders and/or plasticisers are introduced tend to be highly viscous polymers, and the chemical nature of the polymer being organopolysiloxane based as opposed to organic based can have significant effects on compatibility. The level of compatibility effectively determines the amount of extender and/or plasticiser which can be introduced into a polymer composition. Typically this results in the introduction of significantly lower amounts of, in particular, extenders into the composition than may be desired because the extender will not physically mix into the polymer composition sufficiently well, particularly with the pre-formed polymer which is usually the largest component, other than the filler, in the composition. The problem of compatibility of plasticisers and extenders in silicone polymer compositions has been known in the industry ever since the introduction of organic extenders, which as far the inventors are aware, until the present invention has not been addressed other than by the proposal of an ever increasing number of organic based extenders.

DE3342026 describes a process involving the physical blending of a portion of pre-formed organosilicone polymer together with some or all of the plasticiser. The physical blending of polymer and plasticiser is exemplified in the examples using an alpha omega dihydroxypolydimethylsiloxane having a viscosity of merely about 80 000 mPa·s at 20° C. thereby avoiding the problems which the present inventors have addressed and which would be encountered using such a physical blending process for high viscosity polymers wherein such a blending process would involve very expensive mixing equipment for long time periods of time to obtain anything like a suitable blend rendering such a process economically unviable and most likely not provide a suitable blend.

Historically, unreactive siloxanes such as trialkylsilyl terminated polydiorganosiloxanes (for example trimethylsilyl terminated polydimethyl siloxane (PDMS)) were originally used as extenders and/or plasticisers in silicone based sealants because they were chemically similar and had excellent compatibility.

A wide variety of organic compounds and compositions have been proposed for use as extenders for reducing the cost of the silicone sealant compositions. These materials are generally classified into two groups as high volatility extenders and low volatility extenders.

Compositions containing high volatility extenders may contain e.g. toluene or xylene. The high volatility of these compounds causes a number of disadvantages in sealant formulations including, high shrinkage (high volume loss due to evaporation of the solvent), flammability, VOC (volatile organic content), hazardous component labelling, health and safety issues, etc.

Low volatility extenders (sometimes referred to as higher molecular weight extenders), are chosen with the intention of having good compatibility with the polymers in the sealant compositions. These higher molecular weight extenders can completely or partially replace the PDMS plasticizer in the formulation.

Low molecular weight polyisobutylenes (PIB) are proposed as extenders in DE 2364856 and DE 3217516, however, due to the limited compatibility, the maximum amount of PIB extender that can be added to an acetoxy silicone sealant formulation is typically in the 25-30% (by weight) range. A higher addition level causes the extender to bleed to the surface and makes the cured sealant surface sticky. Phosphate esters are described as potential extenders in DE 2802170 and DE 2653499.

Mineral oil fractions (e.g. isoparaffins) and polyalkylbenzenes such as heavy alkylates (alkylated aromatic materials remaining after distillation of oil in a refinery) have also been proposed as extenders. These and other organic compounds and mixtures proposed as extender materials for silicone sealant compositions are described in the following publications:—
GB2041955 describes the use of dodecyl benzene and other alkylarenes as organic extenders. GB2012789 describes the use of trioctyl phosphate for the partial replacement of PDMS. DE3342026 and DE3342027 describe the use of esters of aliphatic monocarboxylic acids as extenders. EP0043501 proposes the use of between 0.2 and 15% by weight of the sealant composition of branched and/or cyclic paraffin hydrocarbons such as cyclohexane, isohexane and isooctodecane. EP0801101 describes the use of a mixture of paraffin oils (molecular weight>180) in combination with one or more alkyl aromatic compounds. EP0842974 describes the use of alkylcyclohexanes (molecular weight>220). WO99/66012 and WO 00/27910 describe oil resistant silicone compositions containing one or more aliphatic liquid polymers and oils, petroleum derived organic oils, alkyl phosphates, polyalkylene glycol, poly (propylene oxides), hydroxyethylated alkyl phenol, dialkyldithiophosphonate, poly (isobutylenes), poly (a-olefins) and mixtures thereof as extenders.

In recent years the industry has increasingly used paraffinic hydrocarbons as extenders. EP0885921 describes the use of paraffinic hydrocarbon mixtures containing 60 to 80% paraffinic and 20 to 40% naphthenic and a maximum of 1% aromatic carbon atoms. EP 0807667 appears to describe a similar extender comprising wholly or partially of a paraffin oil comprising 36-40% cyclic paraffin oils and 58 to 64% non-cyclic paraffin oils. WO99/65979 describes an oil resistant sealant composition comprising a plasticiser which may include paraffinic or naphthenic oils and mixtures thereof amongst other plasticisers. EP1481038 describes the use of a hydrocarbon fluid containing more than 60 wt. % naphthenics, at least 20 wt. % polycyclic naphthenics and an ASTM D-86 boiling point of from 235° C. to 400° C. EP1252252 describes the use of an extender comprising a hydrocarbon fluid having greater than 40 parts by weight cyclic paraffinic hydrocarbons and less than 60 parts by weight monocyclic paraffinic hydrocarbons based on 100 parts by weight of hydrocarbons. EP1368426 describes a sealant composition for use with alkyd paints containing a liquid paraffinic hydrocarbon "extender" which preferably contains greater than 40% by weight of cyclic paraffins.

As mentioned above a fundamental problem with the use of extending materials is their lack of compatibility with components in the uncured silicone sealant composition typically resulting in phase separation during storage and exudation from the cured sealant over the complete temperature range of interest. It is commonly found that after curing extended sealants exude the extender resulting in a significant reduction in the lifetime of the cured sealant, a feature particularly prevalent with extenders having low boiling points, e.g. <100° C. Whilst it is in the interest of the manufacturer to incorporate a high loading of extender into their sealant compositions, the physical mixing of the extender material with the other ingredients as advocated in all of the above documents is prevented through the lack of compatibility particularly with respect to high viscosity polymers where the viscous properties of the polymer component are a physical barrier to the incorporation of large volumes of extender into the sealant compositions. It is generally found therefore that the amount of extender, which may be incorporated into the sealant composition, is typically between 20 and 40% by weight dependent on the extender or combination of extenders used.

Whilst many of the organic extenders proposed above have potential they all generally have problems. For example alkylbenzene extenders have a seemingly suitable combination of properties, i.e. high boiling points, excellent compatibility with the polydiorganosiloxane polymer matrix (resulting in cured silicone sealants of good to excellent transparency), low environmental impact, low vapour pressure (and therefore low shrinkage), positive effect on the rheological properties (reduced stringing). However, when exposed to artificial or natural weathering, alkyl benzene extended sealants tend to discolour (yellow) rather rapidly. After prolonged weathering, these extended sealants continue to yellow, and also lose their transparency. This problem does not occur with other extenders, such as phosphate esters or polyisobutylene.

It will be appreciated by the reader that there is a degree of overlap between plasticisers and extenders used for silicone polymer based compositions. This is at least partially due to the relative decrease in compatibility of the organic compounds concerned with the silicone compositions.

Furthermore, whilst the use of polymers with very high degrees of polymerisation in siloxane formulations, can result in several advantageous properties such as high elasticity the viscosity of such polymers is generally so great (i.e. silicone gums) that they become either completely unmanageable with respect to inter-mixing with other ingredients, such as fillers, cross-linkers, extenders and/or plasticisers, or require very high shear mixers which are expensive to operate. There has therefore been a long-felt need within the industry to develop a process for the ease of introduction of silicone based polymers of very high degrees of polymerisation into compositions whilst avoiding the need for high cost equipment.

The inventors have now surprisingly developed a new process for the introduction of silicone based and/or organic based diluents such as extenders and/or plasticisers in organopolysiloxane formulations permitting, for example, the preparation of polymers of significantly greater chain length otherwise known as degree of polymerisation (dp) and molecular weight and therefore viscosity (when in the absence of the extenders and/or plasticiser) whilst avoiding compounding problems usually encountered with polymers of such viscosities. Such diluted polymers resulting from the above provide products comprising such polymers with new and advantageous properties in comparison with prior art materials.

In accordance with the present invention there is provided a method of making a diluted polysiloxane containing polymer comprising the steps of:—
i) Preparing a polysiloxane containing polymer by the polycondensation of siloxane containing monomers and/or oligomers which comprise condensable groups in the presence of an organopolysiloxane and/or an organic based diluent material, a suitable catalyst and optionally an end-blocking agent; and
ii) Where required quenching the polymerisation process;
wherein the diluent material is substantially retained within the resulting diluted organopolysiloxane.

In accordance with the present invention there is provided a diluted organopolysiloxane containing polymer obtainable using a process comprising the steps of:—
iii) Preparing an organopolysiloxane containing polymer by the polycondensation of siloxane containing monomers and/or oligomers which comprise condensable groups in the presence of an organopolysiloxane and/or an organic based diluent material, a suitable catalyst and optionally an end-blocking agent; and
(ii) Where required quenching the polymerisation process;
wherein the diluent material is substantially retained within the resulting diluted organopolysiloxane.

The concept of "comprising" where used herein is used in its widest sense to mean and to encompass the notions of "include" and "consist of". An organopolysiloxane containing polymer is intended to mean a polymer comprising multiple organopolysiloxane units per molecule and is intended to include a polymer substantially containing only organopolysiloxane groups in the polymer chain or polymers where the backbone contains both organopolysiloxane groups and e.g. organic polymeric groups in the chain. Unless otherwise indicated all viscosity values given are at a temperature of 25° C.

Condensable groups are groups that will, in appropriate conditions, undergo a condensation reaction. The inventors have found that the condensation polymerisation process in accordance with the present invention may utilise any known suitable organopolysiloxane monomer/oligomer and condensation catalyst combination.

Preferably each extender and or plasticiser is miscible or at least substantially miscible with the monomeric starting materials with which they are initially mixed, and more particularly with both intermediate polymerisation reaction products and the final polymerisation product. The term "Substantially miscible extenders and/or plasticisers" are intended to include extenders and/or plasticisers which are completely or largely miscible with the monomer(s) and/or the reaction mixture during polymerisation and hence may include low melting point solids which become miscible liquids in a reaction mixture during the polymerisation process.

An organosiloxane containing polymer is intended to mean a polymer comprising multiple organopolysiloxane groups per molecule and is intended to include a polymer substantially containing only organopolysiloxane groups in the polymer chain or polymers where the backbone contains both organopolysiloxane groups and e.g. organic polymeric groups in chain.

Polycondensation (otherwise known as condensation polymerisation) is the polymerisation of multiple monomers and/or oligomers with the elimination of low molecular weight by-product(s) such as water, ammonia or methanol etc.).

Polycondensation type polymerisation reactions are most generally linked to the interaction of compounds having hydroxyl and/or hydrolysable end groups which can interact with the release of e.g. water or methanol or the like. A selection of condensation reactions which may be additionally utilised for the polymerisation process between monomers and/or oligomers in accordance with the present invention include:—

1) the condensation of organohalosilyl groups with an organoalkoxysilyl groups,
2) the condensation of organohalosilyl groups with organoacyloxysilyl groups,
3) the condensation of organohalosilyl groups with organosilanols,
4) the condensation of organohalosilyl groups with silanolates,
5) the condensation of organo-hydrosilyl groups with organosilanol groups
6) the condensation of organoalkoxysilyl groups with organoacyloxysilyl groups
7) the condensation of organoalkoxysilyl groups with organosilanol groups,
8) the condensation of organoaminosilyl groups with organosilanols,
9) the condensation of organoacyloxysilyl groups silanolate groups
10) the condensation of organoacyloxysilyl groups with organosilanols,
11) the condensation of organooximosilyl groups with organosilanol groups
12) the condensation of organoenoxysilyl groups with organosilanols,
13) The condensation of a siloxane compound comprising one or more hydrosilane functional groups with a siloxane compounds containing at least one alkoxysilane functional group, generating hydrocarbon by-products.

Any of the above condensation type reactions may be used for the block co-polymerisation of monomer(s)/oligomer(s) and as such may be the basis for the polymerisation process in accordance with the present invention.

Preferably the condensable end groups are hydroxyl end groups or hydrolysable end groups.

Hence, one preferred method for the polymerisation process is the polymerisation of straight chain and/or branched organopolysiloxanes of formula (1a)

$$R'_a SiO_{4-a/2} \tag{1a}$$

wherein each R' may be the same or different and denotes a hydrocarbon group having from 1 to 18 carbon atoms, a substituted hydrocarbon group having from 1 to 18 carbon atoms or a hydrocarbonoxy group having up to 18 carbon atoms and a has, on average, a value of from 1 to 3, preferably 1.8 to 2.2.

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as aminofunctional groups, amido-functional groups, and cyano-functional groups; sulphur atoms; and sulphur atom containing groups such as mercapto groups.

Particularly preferred examples of groups R' include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Preferably, at least some and more preferably substantially all of the groups R' are methyl. Some R' groups may be hydrogen groups. Preferably the polydiorganosiloxanes are polydialkylsiloxanes, most preferably polydimethylsiloxanes. They are preferably substantially linear materials, which are end-blocked with a siloxane group of the formula $R''_3SiO_{1/2}$, wherein each R'' is the same or different and is R' or a condensable group. Any suitable combination of condensable end groups may be used for the polymerisation process of the present invention (i.e. the condensable groups chosen must be able to undergo a condensation reaction together in order to polymerise). Preferably at least one R'' group is a hydroxyl or hydrolysable group. Typically the condensable groups used as monomer/oligomer end-groups are as indicated above but may be any groups which will participate in a polycondensation of the monomer/oligomer in the presence of the diluent in accordance with the present invention. A small amount (<20%) of groups $R''_3SiO_{1/2}$, may comprise trialkylsilyl groups.

Starting materials for the condensation reaction of silanol containing siloxanes are organopolysiloxane oligomers having condensable end groups, preferably silicon-bonded hydroxyl groups or hydrolysable groups such as alkoxy groups, which may form silanol groups in situ. Preferably the starting materials have a viscosity of between 10 mPa·s and 50000 mPa·s. Some of the starting materials may comprise non-hydrolysable end-groups but this is not desired. It will also be appreciated that where required organic monomers and/or oligomers having appropriate condensable end groups so as to be polymerisable with said organopolysiloxane monomers and/or oligomers may be introduced in order to form ABA or $AB_n$ type block copolymers.

In the case of polydiorganosiloxane co-polymers the polymeric chain may comprise blocks made from chains of units depicted in figure (2) above where the two $R^5$ groups are:—
both alkyl groups (preferably both methyl or ethyl), or
alkyl and phenyl groups, or
alkyl and fluoropropyl, or
alkyl and vinyl or
alkyl and hydrogen groups.

Typically at least one block will comprise siloxane units in which both $R^5$ groups are alkyl groups.

In accordance with the present invention organic monomers and/or oligomers may be utilised with the intention of providing block copolymers with the siloxane containing monomers and/or oligomers. Preferably the organic monomers and/or oligomers comprise two or more condensable groups which are condensable with the condensable groups of the siloxane monomers and/or oligomers. Examples of organic monomers which may be used in accordance with the present invention include, for example polystyrene and/or substituted polystyrenes such as poly($\alpha$-methylstyrene), poly (vinylmethylstyrene), poly(p-trimethylsilylstyrene) and poly (p-trimethylsilyl-$\alpha$-methylstyrene). Other organic components may include acetylene terminated oligophenylenes, vinylbenzyl terminated aromatic polysulphones oligomers, aromatic polyesters and aromatic polyester based monomers.

However perhaps the most preferred organic based polymeric blocks in A are polyoxyalkylene based blocks. Such polyoxyalkylene compounds preferably comprise a linear predominantly oxyalkylene polymer comprised of recurring oxyalkylene units, (—$C_nH_{2n}$—O—) illustrated by the average formula (—$C_nH_{2n}$—O—)$_y$, wherein n is an integer from 2 to 4 inclusive and y is an integer of at least four. The average molecular weight of each polyoxyalkylene polymer block may range from about 300 to about 10,000. Moreover, the oxyalkylene units are not necessarily identical throughout the polyoxyalkylene monomer, but can differ from unit to unit. A polyoxyalkylene block, for example, can be comprised of oxyethylene units, (—$C_2H_4$—O—); oxypropylene units (—$C_3H_6$—O—); or oxybutylene units, (—$C_4H_8$—O—); or mixtures thereof.

Other polyoxyalkylene monomers and/or oligomers may include for example: units of the structure—

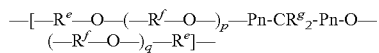

in which Pn is a 1,4-phenylene group, each $R^e$ is the same or different and is a divalent hydrocarbon group having 2 to 8 carbon atoms, each $R^f$ is the same or different and, is, an ethylene group or propylene group, each $R^g$ is the same or different and is a hydrogen atom or methyl group and each of the subscripts p and q is a positive integer in the range from 3 to 30.

The polycondensation process as hereinbefore described requires a suitable condensation catalyst for reactions to proceed. Any suitable polycondensation catalyst may be utilised. These include protic acids, Lewis acids, organic and inorganic bases, metal salts and organometallic complexes. Lewis acid catalysts. (a "Lewis acid" is any substance that will take up an electron pair to form a covalent bond). suitable for the polymerisation in the present invention include, for example, boron trifluoride $FeCl_3$, $AlCl_3$, $ZnCl_2$, $ZnBr_2$, catalysts of formula $M^1R^{21}{}_qX^2{}_f$ where $M^1$ is B, Al, Ga, In or Tl each $R^{21}$ is independently the same (identical) or different and represents a monovalent aromatic hydrocarbon radical having from 6 to 14 carbon atoms, such monovalent aromatic hydrocarbon radicals preferably having at least one electron-withdrawing element or group such as —$CF_3$, —$NO_2$ or —CN, or substituted with at least two halogen atoms; $X^2$ is a halogen atom; q is 1, 2, or 3; and f is 0, 1 or 2; with the proviso that q+f=3. one example of such a catalyst being $B(C_6F_5)_3$.

Catalysts which will promote condensation reactions but also act as equilibration catalysts such as sulphuric acid, hydrochloric acid, Lewis acids, sodium hydroxide, tetramethylammonium hydroxide, tetrabutyl phosphonium silanolate and amines may be used but are not preferred provided the presence of low molecular weight species in the polymer is not to be avoided, or provided the catalyst is inactivated prior to the rearrangement of polymers.

Further suitable condensation catalysts which may be used as the catalyst for the polymerisation reaction in the present invention include condensation catalysts incorporating tin, lead, antimony, iron, cadmium, barium, manganese, zinc, chromium, cobalt, nickel, aluminium, gallium or germanium and zirconium. Examples include metal triflates, organic tin metal catalysts such as triethyltin tartrate, tin octoate, tin oleate, tin naphthate, butyltintri-2-ethylhexoate, tinbutyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate Dibutyltin dibenzoate, stannous octoate, dimethyltin dineodeconoate, dibutyltin dioctoate of which dibutyltin dilaurate, dibutyltin diacetate are particularly preferred.

Titanate and/or zirconate based catalysts may comprise a compound according to the general formula $Ti[OR^{22}]_4$ where each $R^{22}$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of $R^{22}$ include but are not restricted to methyl, ethyl, propyl, isopropyl, butyl, tertiary butyl and a branched secondary alkyl group such as 2,4-dimethyl-3-pentyl. Preferably, when each $R^{22}$ is the same, $R^{22}$ is an isopropyl, branched secondary alkyl group or a tertiary alkyl group, in particular, tertiary butyl.

Alternatively, the titanate may be chelated. The chelation may be with any suitable chelating agent such as an alkyl acetylacetonate such as methyl or ethylacetylacetonate. The catalyst may therefore comprise a mixture or reaction product of

or

wherein M is titanium or zirconium, each R' is the same or different and is a primary, secondary or tertiary aliphatic carbon groups or —$SiR^9{}_3$, in which each $R^9$ is an alkyl group having from 1 to 6 carbon atoms;

Z is a group of the formula —O—Y—O— wherein Y is an optionally branched alkylene group comprising from 1 to 8 carbon atoms; and x is 0 or 2, wherein when x is 0, z is 2 and when x is 2, z is 1; with (iii) a compound having the general formula:

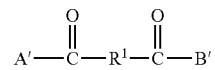

In which
$R^1$ is an optionally substituted alkylene radical having from 1 to 6 carbon atoms,
A' is selected from the group consisting of:
(!) —$(CX_2)_nC(R^2)_3$ wherein n is from 0 to 5,
(!!) an adamantyl group and
(!!!) an adamantyl derivative;

B' is selected from the group consisting of:
a'') —(CX$_2$)$_t$C(R$^2$)$_3$, wherein t has a value of from 0 to 5,
b'') a monovalent alkyl group having from 1 to 6 carbon atoms, and
c'') OR$^3$, wherein R$^3$ is selected from (a'') or (b'')
each X is the same or different and is a halogen group or hydrogen;
each R$^2$ is the same or different and is X or an alkyl radical having one to eight carbon atoms These materials are produced, for example, by reacting an alcoholate as referred to above with an α- or β-diketone or a derivative thereof. More preferred are those partially chelated titanium compounds having two alcoholate groups attached to titanium. The most preferred organotitanium compounds are those wherein the two alcoholate groups are composed of more than 3 carbon atoms, for example, bis(diethylenegly-coxy)-titanium-(2,4-pentanedionate).

When Z is —O—Y—O— each oxygen atom is bound directly to the titanium atom and x is about 2. Preferably Y is an alkylene group containing 1 to 8 carbon atoms. Examples of the O—Y—O group may include 1,3-dioxypropane (O—(CH$_2$)$_3$—O), 2,4-dimethyl-2,4-dioxypentane (O—C((CH$_3$)$_2$)—CH$_2$—C((CH$_3$)$_2$)—O) and 2,3-dimethyl-2,3-dioxybutane (O—C((CH$_3$)$_2$)—C—((CH$_3$)$_2$)—O)

Regarding now compound (iii), preferably at least one and most preferably each X is a halogen radical. Most preferably the halogen radical is a fluorine radical. Similarly it is preferred that at least one and most preferably each R$^2$ group is a halogen radical and most preferably it is a fluorine radical or each R$^2$ group is an alkyl group, most preferably a methyl or ethyl or butyl group. In a most preferred formulation n is zero. R$^1$ is most preferably a methylene group but can have one alkyl or halogen substituted alkyl group with 1 to 5 carbon atoms. The adamantyl group is a derivative of adamantane or tricyclo-3,3,1,1-decane which is a rigid ring system based on three fused cyclohexane rings.

Examples of compound (iii) include Methyl pivaloylacetate (MPA) and Ethyl 4,4,4-trifluoroacetoacetate (TFA)

More preferred are condensation specific catalysts. These include acidic condensation catalysts of the formula R$^{20}$SO$_3$H in which R$^{20}$ represents an alkyl group preferably having from 6 to 18 carbon atoms such as for example a hexyl or dodecyl group, an aryl group such as a phenyl group or an alkaryl group such as dinonyl- or didoecyl-naphthyl. Water may optionally be added. Preferably R$^{20}$ is an alkaryl group having an alkyl group having from 6 to 18 carbon atoms such as dodecylbenzenesulphonic acid (DBSA). Other condensation specific catalysts include n-hexylamine, tetramethylguanidine, carboxylates of rubidium or caesium, hydroxides of magnesium, calcium or strontium and other catalysts as are mentioned in the art, e.g. in GB patent specifications 895091, 918823 and EP 0382365. Also preferred are catalysts based on phosphonitrile chloride, for example those prepared according to U.S. Pat. Nos. 3,839,388 and 4,564,693 or EP application 215 470 and phosphonitrile halide ion based catalysts, as described in GB2252975, having the general formula [X$^2$(PX$^2_2$=N)$_s$PX$^2_3$]$^+$[M$^2$X$^2_{(v-t+1)}$R$^{III}_t$]$^-$, wherein X$^2$ denotes a halogen atom, M$^2$ is an element having an electronegativity of from 1.0 to 2.0 according to Pauling's scale, R$^{III}$ is an alkyl group having up to 12 carbon atoms, s has a value of from 1 to 6, v is the valence or oxidation state of M$^2$ and t has a value of from 0 to v−1.

Alternatively the catalyst may comprise an oxygen-containing chlorophosphazene containing organosilicon radicals having the following general formula:—

Z$^1$—PCl$_2$=N(—PCl$_2$=N)$_n$—PCl$_2$—O in which
Z$^1$ represents an organosilicon radical bonded to phosphorus via oxygen, a chlorine atom or the hydroxyl group and n represents 0 or an integer from 1 to 8. The catalyst may also comprise condensation products of the above and/or tautomers thereof (the catalyst exists in a tautomeric form when Z$^1$ is a hydroxyl group). All or some of the chlorine atoms can be replaced by radicals Q, in which Q represents the hydroxyl group, monovalent organic radicals, such as alkoxy radicals or aryloxy radicals, halogen atoms other than chlorine, organosilicon radicals and phosphorus-containing radicals. The oxygen-containing chlorophosphazenes of formula (I) are preferably those in which no chlorine atom is replaced by a radical Q.

A further alternative catalyst which might be used as the catalyst in the present invention is any suitable compound providing a source of anions comprising at least one quadri-substituted boron atom and protons capable of interaction with at least one silanol group as defined in WO 01/79330. For this type of catalyst, it is important that the boron containing anion does not itself form a covalent bond directly to a silicon atom and that it does not decompose or rearrange to produce an anion which forms a covalent bond directly to a silicon atom. Suitable materials include those incorporating one or more boron atoms disposed within a grouping and several, for example ten or more, halogen atoms connected with each boron atom. The halogen atoms in such compound may be connected to boron atoms by linkages incorporating at least one carbon atom and are selected from fluorine, chlorine and bromine, the most preferred being fluorine.

Preferred anions incorporate one or more atoms of boron having four organic substituents thereon the most preferred being quadri-substituted borates. The organic substituents are suitably halogenated hydrocarbon groups. Such as pentafluorinated phenyl groups and bis(trifluoromethyl)phenyl groups and preferred materials have four such groups bonded to each boron atom. Examples include tetrakis (pentafluoro phenyl) borate anion (perfluorinated aryl borate ion) and the material is preferably employed as the acid of this anion namely H$^+${(C$_6$F$_5$)$_4$B}$^-$. Other operative materials include anions having two quadri-substituted boron atoms, for example diperfluoroinatedaryl borate ions, e.g. H$^+${B(C$_6$F$_5$)$_3$ CNB (C$_6$F$_5$)$_3$}$^-$. Other suitable boron-containing anions for use in the process of the present invention include carboranes, for example of the formula {CB$_9$H$_{10}$}$^-$, {CB$_9$X$^2_5$H$_5$}$^-$, {CB$_{11}$H$_{12}$}$^-$ and {CB$_{11}$X$^2_6$H$_6$}$^-$ wherein each X$^2$ is the same or different and represents a halogen. Carboranes may contain boron atoms which are more highly substituted than quadri-substituted, e.g. pentasubstituted and hexa-substituted, and for the sake of clarity "quadri-substituted" where used herein is intended to include those anions containing quadri-substituted and higher substituted boron atoms.

A further group of catalysts which may be utilised are materials providing in the polymerisation reaction mixture a source of (a) protons capable of interaction with at least one of said silicon bonded hydroxy or alkoxy groups and (b) weakly co-ordinating anions (i.e. an anion which has a negative charge distributed through a comparatively large radical in such a way that the anion is comparatively weakly attractive to proton in the organosilicon reaction mixture i.e. e. is not a strong nucleophile). These include materials having one or more suitable atoms M$^2$, of an element selected from the group consisting of boron, niobium, and aluminium, disposed within the grouping and several, for example ten or more, halogen atoms connected with each atom M$^2$. The halogen atoms in such compound may be connected to atoms M$^2$ by linkages incorporating at least one carbon atom. The halogen atoms are preferably selected from fluorine, chlorine and bromine, the most preferred being fluorine. The preferred weakly coordinating anions may incorporate one or more atoms M of any suitable element capable of supporting an anion substituted to the extent of one more substituent on the atom M² than its neutral valence, for example four substituents on aluminium or boron or six substituents on niobium. Preferred anions incorporate one or more atoms of boron having four organic substituents thereon the most preferred being quadri-substituted borates. The organic substituents are suitably hydrocarbon groups. Three and preferably four of these hydrocarbon groups are preferably aromatic groups, and are preferably highly halogenated. Preferred halogenated hydrocarbons are pentafluorinated phenyl groups and bis(trifluoromethyl)phenyl groups and preferred materials have four such groups bonded to each boron atom. One operative weakly co-ordinating anion is the tetrakis (pentafluoro phenyl) borate anion (otherwise herein referred to as the perfluorinated aryl borate ion) and the material providing the source of protons (a) and weakly co-ordinating anions (b) is the acid of this anion namely $H^+\{(C_6F_5)_4B\}^-$.

The temperatures and pressures used in the process can be the same as those in the processes known to date for the polycondensation of organosilicon compounds.

The polycondensation reaction in accordance with the present invention may be carried out at any appropriate temperature i.e. where appropriate catalysts are used (e.g. DBSA) the general method may be carried out in either batch or continuous modes of operation and no heat or vacuum is required to facilitate the polymerisation (however heat and/or vacuum may be applied to influence the chemical equilibrium, if required). In the case of the phosphazene catalysed methods the polymerisation may occur at temperatures of between 50° C. to 200° C., more preferably 80° C. to 160° C.

The activity of the catalyst is preferably quenched by using a neutralizing agent which reacts with the catalyst to render it non-active. Typically in the case of the acid type condensation catalysts the neutralising agent is a suitable base, for example, an amine such as a mono/di and trialkanolamine, specific examples include but are not limited to monoethanolamine (MEA) and triethanolamine (TEA). In the case of systems using a DBSA catalyst alternative quenching means include aluminasilicate zeolite materials that were found to absorb DBSA and leave a stable polymer. In most cases catalyst residues remain in the polymer product or where appropriate may be removed by filtration or alternative methods. In the case of phosphazene based catalysts once the desired polymer viscosity has been reached, the viscosity of the organosilicon compound obtained in the process can be kept substantially constant by a procedure in which the catalyst used, or a reaction product which has been formed incorporating catalyst residues which likewise promotes the polymerisation process, is inhibited or deactivated by addition of inhibitors or deactivators. Any suitable inhibitors and/or inactivators may be used, specific examples include but are not restricted to triisononylamine, n-butyllithium, lithium siloxanolate, hexamethyldisilazane and magnesium oxide.

The polycondensation reactions may be carried out at any suitable pressure although in order to facilitate removal of by-products formed during the condensation, for example, water, HCl or alcohol, the polymerisation process may take place at a pressure below 80 kPa. Condensation type reactions involving equilibration, may be carried out at pressures above atmospheric if so desired.

The polymerisation process in accordance with the invention may be carried out either batchwise or continuously using any suitable mixers. Where the polycondensation by-product is water, the water can either be removed by chemical drying using e.g. hydrolysable silanes like methyltrimethoxysilane or by physical separation using evaporation, coalescing or centrifuging techniques.

Any suitable method for making the polymer in accordance with the method of the present invention may be used. One suitable method based on the above would be to mix x parts of dimethylhydroxysilyl terminated polydimethyl siloxane oligomer with 100-x parts of a diluent in accordance with the present invention at room temperature and pressure and a suitable amount of catalyst, typically DBSA in an amount of from between 0.1 and 5.0% by weight of the combined weight of polymer and diluent. The diluent and catalyst may be added in any order to the monomer. Mixing is continued until the viscosity of the resulting product becomes constant or starts to decrease with time at which point the catalyst is quenched/neutralised by adding a suitable amount, typically 0.25-2% by weight of the combined weight of polymer and diluent, of an amine such as monoethanolamine. Alternatively the diluent may, for example be added immediately after the polycondensation reaction has commenced or sequentially during the polymerisation process.

Optionally an end-blocking agent may be used to regulate the molecular weight of the polymer and/or add functionality. End-blocking agents are a means of controlling the reactivity/polymer chain length of the polymer by introducing compounds which will react with only one hydrolysable end group, subsequently preventing further polycondensation. It is also a means of introducing alternative end groups on the polymer, e.g. silicon bonded hydrogen groups, alkenyl groups which may then be utilised to produce alternative reactive end groups or provide a non-reactive end group. In the case where the end-blocking process aims to replace a silanol end-group with a triorganosiloxy group to prevent further polymerisation, this may be achieved by incorporating a triorganoalkoxy silane or a triorganosilanol in to the monomers and/or oligomers. Examples of such silanes are trimethyl methoxysilane, methyl phenyl dimethoxysilane, methyl phenyl vinyl ethoxysilane and aminopropyl trimethoxy silane. In the case where alkenyl end groups are required suitable end-blockers include, for example alkenyl silazanes. Hydrolysable groups which may be introduced using end-blocking agents include alkoxy groups and acetoxy groups and $—SiOH_3$, $—(R^a)SiOH_2$, $—(R^a)_2SiOH$, $—R^aSi(OR^b)_2$, $—Si(OR^b)_3$, $—R^a{}_2SiOR^b$ or $—R^a{}_2 Si—R^c— SiR^d{}_p(OR^b)_{3-p}$ where each $R^a$ independently represents a monovalent hydrocarbyl group, for example, an alkyl group, in particular having from 1 to 8 carbon atoms, (and is preferably methyl); each $R^b$ and $R^d$ group is independently an alkyl or alkoxy group in which the alkyl groups suitably have up to 6 carbon atoms; $R^c$ is a divalent hydrocarbon group which may be interrupted by one or more siloxane spacers having up to six silicon atoms; and p has the value 0, 1 or 2. Water and other polycondensation byproducts may also act as endblockers.

Preferably the product resulting from the polymerisation process in accordance with the present invention described comprises the diluent(s) of choice in a polymer matrix, wherein the polymer is a polysiloxane based polymer containing at least two hydroxyl or hydrolysable groups, most preferably the polymer comprises terminal hydroxyl or hydrolysable groups. Preferably the polymer has the general formula $$X^3\text{-}A\text{-}X^1 \tag{2}$$

where X and $X^1$ are independently selected from siloxane groups which terminate in hydroxyl or hydrolysable groups and A is a siloxane containing polymeric chain.

Examples of hydroxyl-terminating or hydrolysable groups $X^3$ or $X^1$ include —SiOH$_3$, —(R$^a$)SiOH$_2$, —(R$^a$)$_2$SiOH, —R$^a$Si(OR$^b$)$_2$, —Si(OR$^b$)$_3$, —R$^a{}_2$SiOR$^b$ or —R$^a{}_2$Si—R$^c$—SiR$^d{}_p$(OR$^b$)$_{3-p}$ where each R$^a$ independently represents a monovalent hydrocarbyl group, for example, an alkyl group, in particular having from 1 to 8 carbon atoms, (and is preferably methyl); each R$^b$ and R$^d$ group is independently an alkyl or alkoxy group in which the alkyl groups suitably have up to 6 carbon atoms; R$^c$ is a divalent hydrocarbon group which may be interrupted by one or more siloxane spacers having up to six silicon atoms; and p has the value 0, 1 or 2. Preferably $X^3$ and/or $X^1$ are contain hydroxyl groups or groups which are otherwise hydrolysable in the presence of moisture.

Examples of suitable siloxane groups A in formula (1) are those which comprise a polydiorgano-siloxane chain. Thus group A preferably includes siloxane units of formula (2)

$$—(R^5{}_sSiO_{(4-s)/2})— \qquad (2)$$

in which each R$^5$ is independently an organic group such as a hydrocarbyl group having from 1 to 10 carbon atoms optionally substituted with one or more halogen group such as chlorine or fluorine and s is 0, 1 or 2. Particular examples of groups R$^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Suitably, at least some and preferably substantially all of the groups R$^5$ are methyl.

Group A in the compound of formula (1) may include any suitable siloxane or siloxane/organic molecular chain providing the resulting polymer a viscosity (in the absence of diluents in accordance with the present invention of up to 20 000 000 mPa·s, at 25° C. (i.e. up to or even more than 200 000 units of formula (2)). In one preferred embodiment A is a linear organopolysiloxane molecular chain (i.e. s=2) for all chain units. Preferred materials have polydiorganosiloxane chains according to the general formula (3)

$$—(R^5{}_2SiO)_t— \qquad (3)$$

in which each R$^5$ is as defined above and is preferably a methyl group and t has a value of up to 200 000. Suitable polymers have viscosities of up to or more than 20 000 000 mPa·s at 25° C. in the absence of the extender(s) and/or plasticiser(s) but when prepared in the presence of the extender(s) and/or plasticiser(s) viscosities are generally in the order of 1000 to 100 000 mPa·s at 25° C. because of the presence of the extender(s) and/or plasticiser(s) in the polymer matrix.

Preferred polysiloxanes containing units of formula (2) are thus polydiorganosiloxanes having terminal, silicon-bound hydroxyl groups or terminal, silicon-bound organic radicals which can be hydrolysed using moisture as defined above. The polydiorganosiloxanes may be homopolymers or copolymers. Mixtures of different polydiorganosiloxanes having terminal condensable groups are also suitable.

In accordance with the present invention component A may alternatively be a block copolymeric backbone comprising at least one block of siloxane groups of the type depicted in formula (2) above and an organic component comprising any suitable organic based polymer backbone for example the organic polymer backbone may comprise, for example, polystyrene and/or substituted polystyrenes such as poly(α-methylstyrene), poly(vinylmethylstyrene), poly(p-trimethylsilylstyrene) and poly(p-trimethylsilyl-α-methylstyrene). Other organic components may include acetylene terminated oligophenylenes, vinylbenzyl terminated aromatic polysulphones oligomers, aromatic polyesters and aromatic polyester based monomers.

However perhaps the most preferred organic based polymeric blocks in A are polyoxyalkylene based blocks. Such polyoxyalkylene blocks preferably comprise a linear predominantly oxyalkylene polymer comprised of recurring oxyalkylene units, (—C$_n$H$_{2n}$—O—) illustrated by the average formula (—C$_n$H$_{2n}$—O—)$_y$ wherein n is an integer from 2 to 4 inclusive and y is an integer of at least four. The average molecular weight of each polyoxyalkylene polymer block may range from about 300 to about 10,000. Moreover, the oxyalkylene units are not necessarily identical throughout the polyoxyalkylene monomer, but can differ from unit to unit. A polyoxyalkylene block, for example, can be comprised of oxyethylene units, (—C$_2$H$_4$—O—); oxypropylene units (—C$_3$H$_6$—O—); or oxybutylene units, (—C$_4$H$_8$—O—); or mixtures thereof.

Other polyoxyalkylene blocks may include for example: units of the structure—

$$—[—R^e—O—(—R^f—O—)_p—Pn-CR^g{}_2\text{-Pn-O}— \\ (—R^f—O—)_q—R^e]—$$

in which Pn is a 1,4-phenylene group, each R$^e$ is the same or different and is a divalent hydrocarbon group having 2 to 8 carbon atoms, each R$^f$ is the same or different and, is, an ethylene group or propylene group, each R$^g$ is the same or different and is, a hydrogen atom or methyl group and each of the subscripts p and q is a positive integer in the range from 3 to 30.

Preferably the silicone based and/or organic based diluent is/are one or more extenders and/or plasticisers. Generally the diluent(s) used in accordance with the present invention are not intended to chemically bond to the monomer/oligomer starting materials, intermediates or final polymerisation product. However, some chemical bonding and/or reversible interactions between the polymer reaction products and diluent(s) may occur. Preferably, chemical bonding, which takes place between the polymer and the diluent(s) involves substituents along the backbone of the polymer rather than with polymer end groups leading to a cross-linking network between polymer and diluent. An advantage of such interaction may be the production of a polymer product in accordance with the process of the present invention which in use is less likely to result in diluent loss and/or shrinkage. For the sake of clarification with respect to this paragraph the term "chemically bond" is intended to mean the formation of covalent or the like bonds and not mere chemical interactions such as hydrogen bonding or the like.

Preferably the diluted polymer of the present invention comprises a polymer component which in accordance with the present invention is a silicon containing polymer having a number average molecular weight ($M_n$) of at least 132 000 as determined following ASTM D5296-05 and calculated as polystyrene molecular weight equivalents and a degree of polymerisation of at least 1800. For organopolysiloxane polymers an $M_n$ value of 132 000 equate to a weight averaged molecular weight ($M_w$) of 198,000. and would typically have a viscosity of greater than 1000000 mPa·s at 25° C.

Any suitable diluent or combination of diluents may be utilised in the process in accordance with the present invention.

These include each of the following alone or in combination with others from the list:—trialkylsilyl terminated polydialkyl siloxane where the alkyl groups are preferably methyl groups, where each alkyl group may be the same or different and comprises from 1 to 6 carbon atoms but is preferably a methyl group, preferably with a viscosity of from 100 to 100 000 mPa·s at 25° C. and most preferably from 1000 to 60 000 mPa·s at 25° C.;

polyisobutylenes (PIB),
phosphate esters such as trioctyl phosphate
polyalkylbenzenes,
linear and/or branched alkylbenzenes such as heavy alkylates, dodecyl benzene and other alkylarenes,
esters of aliphatic monocarboxylic acids;
unreactive short chain siloxanes
linear or branched mono unsaturated hydrocarbons such as linear or branched alkenes or mixtures thereof containing from 12 to 25 carbon atoms; and/or mineral oil fractions comprising linear (e.g. n-paraffinic) mineral oils, branched (iso-paraffinic) mineral oils, cyclic (referred in some prior art as naphthenic) mineral oils and mixtures thereof. Preferably the hydrocarbons utilised comprise from 5 to 25 carbon atoms per molecule.

Preferred extenders include the mineral oil fractions, alkylcycloaliphatic compounds and alkybenzenes including polyalkylbenzenes.

Preferably extender (c) may comprise any suitable mineral oil, examples include linear or branched mono unsaturated hydrocarbons such as linear or branched alkenes or mixtures thereof containing at least 12, e.g. from 12 to 25 carbon atoms; and/or mineral oil fractions comprising linear (e.g. n-paraffinic) mineral oils, branched (iso-paraffinic) mineral oils, cyclic (referred in some prior art as naphthenic) mineral oils and mixtures thereof. Preferably the hydrocarbons utilised comprise at least 10, preferably at least 12 and most preferably greater than 20 carbon atoms per molecule.

Any suitable mixture of mineral oil fractions may be utilised as the extender in the present invention but high molecular weight extenders (e.g. >220) are particularly preferred. Examples include:—
alkylcyclohexanes (molecular weight>220);
paraffinic hydrocarbons and mixtures thereof containing from 1 to 99%, preferably from 15 to 80% n-paraffinic and/or isoparaffinic hydrocarbons (linear branched paraffinic) and 1 to 99%, preferably 85 to 20% cyclic hydrocarbons (naphthenic) and a maximum of 3%, preferably a maximum of 1% aromatic carbon atoms. The cyclic paraffinic hydrocarbons (naphthenics) may contain cyclic and/or polycyclic hydrocarbons. Any suitable mixture of mineral oil fractions may be used, e.g. mixtures containing
 (i) 60 to 80% paraffinic and 20 to 40% naphthenic and a maximum of 1% aromatic carbon atoms;
 (ii) 30-50%, preferably 35 to 45% naphthenic and 70 to 50% paraffinic and or isoparaffinic oils;
 (iii) hydrocarbon fluids containing more than 60 wt. % naphthenics, at least 20 wt. % polycyclic naphthenics and an ASTM D-86 boiling point of greater than 235° C.;
 (iv) hydrocarbon fluid having greater than 40 parts by weight naphthenic hydrocarbons and less than 60 parts by weight paraffinic and/or ispoaraffinic hydrocarbons based on 100 parts by weight of hydrocarbons.

Preferably the mineral oil based extender or mixture thereof comprises at least one of the following parameters:—
 (i) a molecular weight of greater than 150, most preferably greater than 200;
 (ii) an initial boiling point equal to or greater than 230° C. (according to ASTM D 86).
 (iii) a viscosity density constant value of less than or equal to 0.9; (according to ASTM 2501)
 (iv) an average of at least 12 carbon atoms per molecule, most preferably 12 to 30 carbon atoms per molecule;
 (v) an aniline point equal to or greater than 70° C., most preferably the aniline point is from 80 to 110° C. (according to ASTM D 611);
 (vi) a naphthenic content of from 20 to 70% by weight of the extender and a mineral oil based extender has a paraffinic content of from 30 to 80% by weight of the extender according to ASTM D 3238);
 (vii) a pour point of from −50 to 60° C. (according to ASTM D 97);
 (viii) a kinematic viscosity of from 1 to 20 cSt at 40° C. (according to ASTM D 445)
 (ix) a specific gravity of from 0.7 to 1.1 (according to ASTM D1298);
 (x) a refractive index of from 1.1 to 1.8. at 20° C. (according to ASTM D1218)
 (xi) a density at 15° C. of greater than 700 kg/m$^3$ (according to ASTM D4052) and/or
 (xii) a flash point of greater than 100° C., more preferably greater than 110° C. (according to ASTM D 93)
 (xiii) a saybolt colour of at least +30 (according to ASTM D 156)
 (xiv) a water content of less than or equal to 250 ppm (according to ASTM D6304)
 (xv) a Sulphur content of less than 2.5 ppm (according to ASTM D 4927)

The alkylbenzene compounds suitable for use include heavy alkylate alkylbenzene or an alkylcycloaliphatic compound. Examples of alkyl substituted aryl compounds useful as extenders and/or plasticisers are compounds which have aryl groups, especially benzene substituted by alkyl and possibly other substituents, and a molecular weight of at least 200. Examples of such extenders as described in U.S. Pat. No. 4,312,801, the content of which is incorporated herein by reference. These compounds can be represented by general formula (I), (II), (III) and (IV)

The alkylbenzene compounds suitable for use include heavy alkylate alkylbenzene or an alkylcycloaliphatic compound. Examples of alkyl substituted aryl compounds useful as extenders and/or plasticisers are compounds which have aryl groups, especially benzene substituted by alkyl and possibly other substituents, and a molecular weight of at least 200. Examples of such extenders as described in U.S. Pat. No. 4,312,801, the content of which is incorporated herein by reference. These compounds can be represented by general formula (I), (II), (III) and (IV)

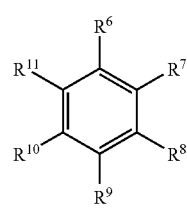

(I)

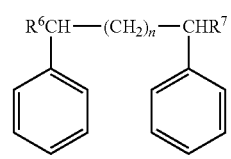

(II)

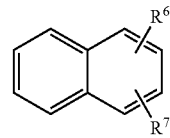

(III)

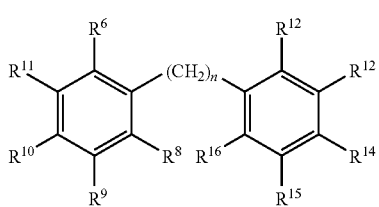

where $R^6$ is an alkyl chain of from 1 to 30 carbon atoms, each of $R^7$ through to $R^{16}$ is independently selected from hydrogen, alkyl, alkenyl, alkynyl, halogen, haloalkyl, nitrile, amine, amide, an ether such as an alkyl ether or an ester such as an alkyl ester group, and n is an integer of from 1 to 25.

In particular, the extender used in accordance with the process of the present invention is of formula (I) where each of $R^7$, $R^8$, $R^9$, $R^{10}$ and $R^{11}$ is hydrogen and $R^6$ is a $C_{10}$-$C_{13}$ alkyl group. A particularly useful source of such compounds are the so-called "heavy alkylates", which are recoverable from oil refineries after oil distillation. Generally distillation takes place at temperatures in the range of from 230 to 330° C., and the heavy alkylates are present in the fraction remaining after the lighter fractions have been distilled off.

Examples of alkylcycloaliphatic compounds are substituted cyclohexanes with a molecular weight in excess of 220. Examples of such compounds are described in EP 0842974, the content of which is incorporated herein by reference. Such compounds may be represented by general formula (V).

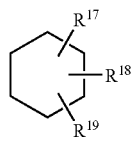

where $R^{17}$ is a straight or branched alkyl group of from 1 to 25 carbon atoms, and $R^{18}$ and $R^{19}$ are independently selected from hydrogen or a $C_{1-25}$ straight or branched chain alkyl group.

Most preferably the extender comprises a mineral oil fraction.

The amount of diluent which may be included in the composition will depend upon factors such as the end use of the polymer prepared in accordance with the process in accordance with the present invention, the physical characteristics, e.g. molecular weight, of the diluent(s) concerned etc. Products of the process in accordance with the present invention may contain from 5% w/w up to 70% w/w diluent (based on the combined weight of polymer and diluent(s)) depending upon these factors. In general however, the higher the molecular weight of the diluent(s), the less will be tolerated in the composition. Typical compositions will contain up to 70% w/w diluent(s). More suitable polymer products comprise from 30-60% w/w of a linear diluent(s) whereas 25-35% w/w will be more preferred when the diluent is a heavy alkylate. The diluent content will typically be determined by the intended end use of the product prepared.

One of the most important aspects of the present invention is the fact that by polymerising the polymer in the presence of the diluent(s) the resulting polymer/extenders and/or polymer/plasticiser mix throughout the polymerisation process has a significantly lower viscosity than would normally be expected because the viscosity reducing diluent(s) is/are present in the polymer mixture as it polymerises avoiding the need for expensive and time consuming blending processes typically used in the industry for introducing extenders and plasticisers into the polymer, usually at the same time as some or all other constituents in end compositions. Products of the process in accordance with the present invention may contain polymers of significantly greater chain length/molecular weight than could be practically used in combination with a diluent under prior art blending with pre-prepared polymer processes. This is because the viscosity of such polymers would be too high to enable the sufficiently thorough blending of the diluent(s) into the polymer. The inventors believe that the mixing of any amount of diluent with the polymeric end product is enhanced by the process of the present invention, i.e. even when only a small amount for example. 5-20% by weight of diluent is present during polymerisation process in accordance with the present invention. For example using the standard process of mixing diluent(s) with filler and pre-prepared polymer together one would typically only be able to incorporate approximately 28% by weight of diluent(s) in an 80 000 mPa·s polymer because of problems with handling and blending using polymers of greater viscosity. Hence, by introducing the diluent(s) prior to polymerisation, blending problems are avoided and polymers which in the absence of diluent(s) would have a viscosity of over 1 million mPa·s can be used in conjunction with the polymer (i.e. polymers having molecular weights and therefore viscosities not previously realistically contemplated because of handling problems.

The ratio between the diluent(s) and the organopolysiloxane constituent in the product produced by the process of the present invention that can be achieved is dependent on the miscibility of the diluent(s) in the polydimethylsiloxanes and vice versa. The miscibility was found to depend at least in part, on the molecular weight of the organopolysiloxanes.

This product of the process in accordance with the present invention also provides the user with formulations comprising the diluted polymer of the present invention with a variety of improved physical characteristics, not least the elasticity of resulting products, because of the use of polymers having polymer chain length/viscosities which hitherto would not have been possible to use. Applications include, sealants formulations, coating formulations, high consistency organopolysiloxane gum formulations for high consistency rubber applications, and for dispersions thereof in volatile and non-volatile alkylsilicone fluids for use in personal care products.

In accordance with the present invention there is provided a method of making an a moisture curable composition capable of cure to an elastomeric body comprising the steps of:—

(i) Preparing a diluted n organopolysiloxane polymer as hereinbefore described and
(ii) compounding the resulting diluted organopolysiloxane polymer with a suitable cross-linking agent which is reactive with the organopolysiloxane polymer, a suitable condensation catalyst and optionally filler.

In one embodiment the process is used to prepare a one or two part organopolysiloxane sealant composition. A two part composition comprises in the first part diluted polymer and filler (when required) and in the second part catalyst and cross-linker are provided for mixing in an appropriate ratio (e.g. from 1:1 to 10:1) immediately prior to use. Additional additives to be discussed below may be provided in either the first or second part of the two part composition. A multi-pack sealant composition as hereinbefore described comprising a first pack comprising polymer (a) and filler (e) (when required) and a second pack comprising catalyst (d) and cross-linker (b) and wherein optional additives are in either or both said first and second packs.

In accordance with a still further embodiment of the present invention there is provided a moisture curable composition capable of cure to an elastomeric body, the composition comprising
a) A diluted organopolysiloxane polymer as hereinbefore described
b) A siloxane and/or silane cross-linker having at least two groups per molecule which are reactable with the terminal groups in (a);
c) Optionally one or more fillers and
d) a suitable cure catalyst Any suitable cross-linker may be used. The crosslinker used (b) in the moisture curable composition as hereinbefore described is preferably a silane compound containing hydrolysable groups. These include one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, an propoxy) and alkenyloxy groups (for example isopropenyloxy and 1-ethyl-2-methylvinyloxy).

In the case of siloxane based cross-linkers the molecular structure can be straight chained, branched, or cyclic.

The crosslinker may have two but preferably has three or four silicon-bonded condensable (preferably hydroxyl and/or hydrolysable) groups per molecule which are reactive with the condensable groups in organopolysiloxane polymer (a). When the crosslinker is a silane and when the silane has three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic groups is methyl.

Silanes and siloxanes which can be used as crosslinkers include alkyltrialkoxysilanes such as methyltrimethoxysilane (MTM) and methyltriethoxysilane, alkenyltrialkoxysilanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyl-tris-methylethylketoximo)silane, methyltris(methylethylketoximino)silane, methyltris(isopropenoxy)silane, vinyltris(isopropenoxy)silane, ethylpolysilicate, n-propylorthosilicate, ethylorthosilicate, dimethyltetraacetoxydisiloxane. The cross-linker used may also comprise any combination of two or more of the above.

The amount of crosslinker present in the composition will depend upon the particular nature of the crosslinker and in particular, the molecular weight of the molecule selected. The compositions suitably contain crosslinker in at least a stoichiometric amount as compared to the polymeric material described above. Compositions may contain, for example, from 2-30% w/w of crosslinker, but generally from 2 to 10% w/w. Acetoxy crosslinkers may typically be present in amounts of from 3 to 8% w/w preferably 4 to 6% w/w whilst oximino cross-linkers, which have generally higher molecular weights will typically comprise from 3-8% w/w.

The composition further comprises a condensation catalyst. This increases the speed at which the composition cures. The catalyst chosen for inclusion in a particular silicone sealant composition depends upon the speed of cure required. Any suitable condensation catalyst may be utilised to cure the composition including tin, lead, antimony, iron, cadmium, barium, manganese, zinc, chromium, cobalt, nickel, titanium, aluminium, gallium or germanium and zirconium based catalysts such as organic tin metal catalysts and 2-ethylhexoates of iron, cobalt, manganese, lead and zinc may alternatively be used. Organotin, titanate and/or zirconate based catalysts are preferred. Silicone sealant compositions which contain oximosilanes or acetoxysilanes generally use a organotin catalysts of the type as hereinbefore described. For compositions which include alkoxysilane cross-linker compounds, the preferred curing catalysts are titanate or zirconate compounds including chelated titanates and zirconates as hereinbefore described.

Preferably the catalyst, component (d), will be present in an amount of from 0.3 to 6 parts by weight per 100 parts by weight of component (a), i.e. from about 0.2 to 2 weight % of the composition component (d) may be present in an amount of greater than 6 parts by weight in cases where chelating agents are used.

Compositions of this invention may contain, as optional constituents, other ingredients which are conventional to the formulation of silicone rubber sealants and the like. For example, the compositions will normally contain one or more finely divided, reinforcing fillers such as high surface area fumed and precipitated silicas including rice hull ash and to a degree calcium carbonate as discussed above, or additional nonreinforcing fillers such as crushed quartz, diatomaceous earths, barium sulphate, iron oxide, titanium dioxide and carbon black, talc, wollastonite. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite Aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluninosilicates comprise ground silicate minerals, such as but not limited to, sillimanite; $Al_2SiO_5$; mullite; $3Al_2O_3.2SiO_2$; kyanite; and $Al_2SiO_5$ The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

In addition, a surface treatment of the filler(s) may be performed, for example with a fatty acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other sealant components The surface treatment of the fillers makes the ground silicate minerals easily wetted by the silicone polymer. These surface modified fillers do not clump, and can be homogeneously incorporated into the silicone polymer. This results in improved room temperature mechanical properties of the uncured compositions. Furthermore, the surface treated fillers give a lower conductivity than untreated or raw material.

The proportion of such fillers when employed will depend on the properties desired in the elastomer-forming composition and the cured elastomer. Usually the filler content of the composition will reside within the range from about 5 to about 800 parts by weight, preferably from 25 to 400 parts by weight per 100 parts by weight of the polymer excluding the diluent portion.

Other ingredients which may be included in the compositions include but are not restricted to co-catalysts for accelerating the cure of the composition such as metal salts of carboxylic acids and amines; rheological modifiers; Adhesion promoters, pigments, Heat stabilizers, Flame retardants, UV stabilizers, Chain extenders, electrically and/or heat conductive fillers, Fungicides and/or biocides and the like (which may suitably by present in an amount of from 0 to 0.3% by weight), water scavengers, (typically the same compounds as those used as cross-linkers or silazanes). It will be appreciated that some of the additives are included in more than one list of additives. Such additives would then have the ability to function in all the different ways referred to.

The rheological additives include silicone organic co-polymers such as those described in EP 0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide (EO) and propylene oxide (PO), and silicone polyether copolymers; as well as silicone glycols.

Any suitable adhesion promoter(s) may be incorporated in a sealant composition in accordance with the present invention. These may include for example alkoxy silanes such as aminoalkylalkoxy silanes, epoxyalkylalkoxy silanes, for example, 3-glycidoxypropyltrimethoxysilane and, mercapto-alkylalkoxy silanes and γ-aminopropyl triethoxysilane, reaction products of ethylenediamine with silylacrylates. Isocyanurates containing silicon groups such as 1,3,5-tris(trialkoxysilylalkyl) isocyanurates may additionally be used. Further suitable adhesion promoters are reaction products of epoxyalkylalkoxy silanes such as 3-glycidoxypropyltrimethoxysilane with amino-substituted alkoxysilanes such as 3-aminopropyltrimethoxysilane and optionally alkylalkoxy silanes such as methyl-trimethoxysilane. epoxyalkylalkoxy silane, mercaptoalkylalkoxy silane, and derivatives thereof.

Heat stabilizers may include Iron oxides and carbon blacks, Iron carboxylate salts, cerium hydrate, titania, barium zirconate, cerium and zirconium octoates, and porphyrins.

Flame retardants may include for example, carbon black, hydrated aluminium hydroxide, and silicates such as wollastonite, platinum and platinum compounds.

Chain extenders may include difunctional silanes which extend the length of the polysiloxane polymer chains before crosslinking occurs and, thereby, reduce the modulus of elongation of the cured elastomer. Chain extenders and crosslinkers compete in their reactions with the functional polymer ends; in order to achieve noticeable chain extension, the difunctional silane must have substantially higher reactivity than the typical trifunctional cross-linker. Suitable chain extenders for condensation cure systems are, for example, Diacetamideosilanes such as dialkyldiacetamidosilanes or alkenylalkyldiacetamidosilanes, particularly methylvinyldi-di(N-methylacetamido)silane
diacetoxysilanes, such as dialkyldiacetoxysilanes and alkylalkenyldiacetoxysilanes diaminosilanes, such as dialkyldiaminosilanes or alkylalkenyldiaminosilanes particularly those where each amino group has one Si—N bond and two N—C bonds;
dialkoxysilanes such as
dialkoxysiloxanes (having from 2 to 25 Si—O linkages),
diamidosilanes such as dialkyldiamidosilanes or alkylalkenyldiamidosilanes hexaorganodisilazanes (wherein the organo groups are each independently alkyl groups having 1 to 6 carbon atoms or alkenyl groups having 1 to 6 carbon atoms)
diketoximinosilanes such as dialkylkdiketoximinosilanes and alkylalkenyldiketoximinosilanes α-aminoalkyldialkoxy-alkylsilanes wherein the alkyl and alkoxy groups contain from 1 to 5 carbon atoms, such as α-aminomethyldialkoxym-ethylsilanes particularly preferred are those where the aminomethyl group is an N,N-dialkylaminomethyl group
and chain extenders in the form of silicon compounds having the formula

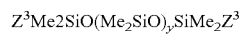

or

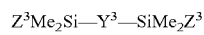

where $Z^3$, $Y^3$, y and m are as hereinbefore described.

Specific examples of chain extenders include alkenyl alkyl dialkoxysilanes such as vinyl methyl dimethoxysilane, vinyl ethyldimethoxysilane, vinyl methyldiethoxysilane, vinylethyldiethoxysilane, alkenylalkyldioximosilanes such as vinyl methyl dioximosilane, vinyl ethyldioximosilane, vinyl methyldioximosilane, vinylethyldioximosilane, alkenylalkyldiacetoxysilanes such as vinyl methyl diacetoxysilane, vinyl ethyldiacetoxysilane, and alkenylalkyldihydroxysilanes such as vinyl methyl dihydroxysilane, vinyl ethyldihydroxysilane, vinyl methyldihydroxysilane, vinylethyldihydroxysilane.methylphenyl-dimethoxysilane, di-butoxy diacetoxysilane, Alkylalkenylbis(N-alkylacetamido) silanes such as methylvinyldi-(N-methylacetamido)silane, and methylvinyldi-(N-ethylacetamido)silane; dialkylbis(N-arylacetamido) silanes such as dimethyldi-(N-methylacetamido)silane; and dimethyldi-(N-ethylacetamido)silane; Alkylalkenylbis(N-arylacetamido) silanes such as methylvinyldi(N-phenylacetamido)silane and dialkylbis(N-arylacetamido) silanes such as dimethyldi-(N-phenylacetamido)silane, methylvinyl bis (N-methylacetamido)silane, methylhydrogendiacetoxysilane, dimethylbis(N-diethylaminoxy)silane and dimethylbis (sec.-butylamino)silane. The chain extender used may also comprise any combination of two or more of the above.

Electrically conductive fillers may include carbon black, metal particles such as silver particles any suitable, electrically conductive metal oxide fillers such as titanium oxide powder whose surface has been treated with tin and/or antimony, potassium titanate powder whose surface has been treated with tin and/or antimony, tin oxide whose surface has been treated with antimony, and zinc oxide whose surface has been treated with aluminium.

Thermally conductive fillers may include metal particles such as powders, flakes and colloidal silver, copper, nickel, platinum, gold aluminium and titanium, metal oxides, particularly aluminium oxide (Al$_2$O$_3$) and beryllium oxide (BeO); magnesium oxide, zinc oxide, zirconium oxide; Ceramic fillers such as tungsten monocarbide, silicon carbide and aluminium nitride, boron nitride and diamond.

Any suitable Fungicides and biocides may be utilised, these include N-substituted benzimidazole carbamate, benzimidazolylcarbamate such as methyl 2-benzimidazolylcarbamate, ethyl 2-benzimidazolylcarbamate, isopropyl 2-benzimidazolylcarbamate, methyl N-{2-[1-(N,N-dimethylcarbamoyl)benzimidazolyl]}carbamate, methyl N-{2-[1-(N,N-dimethylcarbamoyl)-6-methylbenzimidazolyl]}carbamate, methyl N-{2-[1-(N,N-dimethylcarbamoyl)-5-methylbenzimidazolyl]}carbamate, methyl N-{2-[1-(N-methylcarbamoyl)benzimidazolyl]}carbamate, methyl N-{2-[1-(N-methylcarbamoyl)-6-methylbenzimidazolyl]}carbamate, methyl N-{2-[1-(N-methylcarbamoyl)-5-methylbenzimidazolyl]}carbamate, ethyl N-{2-[1-(N,N-dimethylcarbamoyl)benzimidazolyl]}carbamate, ethyl N-{2-[2-(N-methylcarbamoyl)benzimidazolyl]}carbamate, ethyl N-{2-[1-(N,N-dimethylcarbamoyl)-6-methylbenzimidazolyl]}carbamate, ethyl N-{2-[1-(N-methylcarbamoyl)-6-methylbenzimidazolyl]}carbamate, isopropyl N-{2-[1-(N,N-dimethylcarbamoyl)benzimidazolyl]}carbamate, isopropyl N-{2-[1-(N-methylcarbamoyl)benzimidazolyl]} carbamate, methyl N-{2-[1-(N-propylcarbamoyl)benzimidazolyl]}carbamate, methyl N-{2-[1-(N-butylcarbamoyl)benzimidazolyl]}carbamate, methoxyethyl N-{2-[1-(N-propylcarbamoyl)benzimidazolyl]}carbamate, methoxyethyl N-{2-[1-(N-butylcarbamoyl)benzimidazolyl]}carbamate, ethoxyethyl N-{2-[1-(N-propylcarbamoyl)benzimidazolyl]}carbamate, ethoxyethyl N-{2-[1-(N-butylcarbamoyl)benzimidazolyl]}carbamate, methyl N-{1-(N,N-dimethylcarbamoyloxy)benzimidazolyl]}carbamate, methyl N-{2-[N-methylcarbamoyloxy)benzimidazolyl]}carbamate, methyl N-{2-[1-(N-butylcarbamoyloxy)benzoimidazolyl]}carbamate, ethoxyethyl N-{2-[1-(N-propylcarbamoyl)benzimidazolyl]} carbamate, ethoxyethyl N-{2-[1-(N-butylcarbamoyloxy)benzoimidazolyl]}carbamate, methyl N-{2-[1-(N,N-dimethylcarbamoyl)-6-chlorobenzimidazolyl]} carbamate, and methyl N-{2-[1-(N,N-dimethylcarbamoyl)-6-nitrobenzimidazolyl]} carbamate. 10,10'-oxybisphenoxarsine (trade name: Vinyzene, OBPA), di-iodomethyl-para-tolylsulfone, benzothiophene-2-cyclohexylcarboxamide-S,S-dioxide, N-(fluordichloridemethylthio)phthalimide (trade names: Fluor-Folper, Preventol A3). Methyl-benzimideazol-2-ylcarbamate (trade names: Carbendazim, Preventol BCM), Zinc-bis(2-pyridylthio-1-oxide) (zinc pyrithion) 2-(4-thiazolyl)-benzimidazol, N-phenyl-iodpropargylcarbamate, N-octyl-4-isothiazolin-3-on, 4,5-dichloride-2-n-octyl-4-isothiazolin-3-on, N-butyl-1,2-benzisothiazolin-3-on and/or Triazolyl-compounds, such as tebuconazol in combination with zeolites containing silver.

The compositions are preferably room temperature vulcanisable compositions in that they cure at room temperature without heating.

The compositions can be prepared by mixing the ingredients employing any suitable mixing equipment. Other components may be added as necessary. For example preferred one part, moisture curable compositions may be made by mixing together the extended polysiloxane having hydroxyl or hydrolysable groups and any organosilicon plasticizer or filler used, and mixing this with a pre-mix of the crosslinker and catalyst. UV-stabilisers pigments and other additives may be added to the mixture at any desired stage.

After mixing, the compositions may be stored under substantially anhydrous conditions, for example in sealed containers, until required for use.

Compositions according to this aspect of the are stable in storage but cure on exposure to atmospheric moisture and may be employed in a variety of applications, for example as coating, caulking and encapsulating materials. They are, however, particularly suitable for sealing joints, cavities and other spaces in articles and structures which are subject to relative movement. They are thus particularly suitable as glazing sealants and for sealing building structures where the visual appearance of the sealant is important.

Thus in a further aspect, the invention provides a method of sealing a space between two units, said method comprising applying a composition as described above and causing or allowing the composition to cure. Suitable units include glazing structures or building units as described above and these form a further aspect of the invention.

The polymerisation in the presence of the diluent gives several advantages with respect to sealant formulations. In respect to rheology, the increase in polymer chain length enabled due to the presence of the diluent compensates for the amount of diluent present in the diluted sealant and as such the viscosity of the diluted polymer is significantly higher than it would be if the diluent had been added to a standard polymer used in sealant formulations currently having for example a viscosity of 80000 to 100 000 mPa·s at 25° C. The lower modulus of the resulting sealant additionally means that more movement is possible in the joint being sealed, to the extent that even if diluent loss occurs, the effective modulus caused by the presence of high molecular weight polymers which may be prepared in accordance with the process of the present invention is able to compensate for stress caused to the seal due to shrinkage. The product of the process of the present invention gives superior processing advantages due to the comparatively low viscosity of the diluted polymer when considering the molecular weight of the polymer.

The applicants have found that sealant formulations comprising about 5-20% by weight diluent (based on the total weight of the organosiloxane polymer and diluent(s) provides the user with a very highly elastic sealant subsequent to curing because of the high chain length/viscosity of the polymer being used (when one considers the viscosity in the absence of the diluent). Such sealants provide an elongation at break of significantly greater than 650%.

One particular problem which the silicone based sealant industry have had to contend with is the production of a paintable cured sealant surface. Typically this has not been possible with the vast majority of current cured silicone sealant formulations (if any in real terms). However, the applicants have found that sealant formulations comprising high levels of diluents (e.g. >45% by weight of polymer and diluent(s) are readily paintable with water based paints because of the high proportion of organic compounds present in the formulation, which typically would not have been possible because of the mixing and compatibility problems. Tests suggest that said paintable sealant formulations are comparable if not an improvement over acrylic type sealants and because of their reduction in the amount of silicone present are of comparable price.

In a further embodiment of the present invention there is provided a method of producing a cured silicone elastomer with a surface coated with a hardened protective coating comprising, exposing a composition in accordance with any one of claim 1 to 10 to moisture until a cured elastomeric surface is obtained and a homogeneous dull surface develops, thereafter applying a protective coating composition, hardenable at ambient conditions, over at least a portion of the cured elastomeric surface where the protective coating composition wets the surface to which it is applied and produces an essentially flaw-free film and, thereafter, allowing the protective coating composition to harden.

A further advantage of polymers made by the process of the present invention is that they contain very low levels of cyclic siloxanes after polymerisation has completed.

In a further application of the present invention the diluted polymer resulting from the polymerisation process may be dispersed in a volatile or non-volatile low molecular weight organopolysiloxane based fluid having a viscosity of between 4 and 100 mPa·s for use in personal care applications.

The volatile silicone is appropriately a low viscosity dialkylsiloxane (typically a dimethylsiloxane) fluid which preferably contains dimethylsiloxane units and optionally trimethylsiloxane units and preferably a viscosity of less than about 10 mPa·s at 25° C. The low viscosity dialkylsiloxane fluid, may be either a cyclopolysiloxane having a degree of polymerisation of from 3 to 10 or a linear siloxane compound having a degree of polymerisation of from 1 to 10, preferably between 1 and 5.

The cyclopolysiloxane compounds have been assigned the adopted name "CYCLOMETHICONE" by The Cosmetics, Toiletries and Fragrance Association, Inc., Washington, D.C. (CTFA). Both the cyclopolysiloxanes and the linear siloxanes are clear fluids, and are essentially odorless, nontoxic, nongreasy and nonstinging. Cosmetically, these volatile alkylsilicone fluids are nonirritating to skin, and exhibit enhanced spreadability and ease of rub-out when applied. Once applied, the materials evaporate leaving behind no residue.

Alkylsilicone fluids which are operable in accordance with the present invention leave substantially no residue after thirty minutes at room temperature when one gram of fluid is placed at the centre of a No. 1 circular filter paper having a diameter of 185 mm supported at its perimeter in open room atmosphere. Representative linear alkylsilicone fluids include hexamethyldisiloxane which has a boiling point of 99.5° C. and octamethyltrisiloxane which has a boiling point of 152° C. Representative cyclic alkylsilicone fluids suitable for the present application include hexamethylcyclotrisiloxane which has a boiling point of 133° C.; octamethylcyclotetrasiloxane which has a boiling point of 171° C. and decamethylcyclopentasiloxane which has a boiling point of 205° C. These alkylsilicone fluids may be used alone, or as mixtures in combinations of two or more of the individual fluids. Mixtures of the alkylsilicone fluids will result in a volatile material having an evaporating behaviour different from any one of the individual alkylsilicone fluids. The alkylsilicone fluids and their methods of preparation are known in the art, and such fluids are commercially available.

In some instances, it may be desirable to replace one or more of the methyl groups in the alkylsilicone fluid with other groups. Thus, there may be substituted groups such as alkyl radicals having two to twelve carbon atoms; aryl radicals having six to ten carbon atoms; amine groups; vinyl; hydroxy; haloalkyl groups; aralkyl groups; and acrylate groups.

Compositions in accordance with the present invention comprising a blend of the diluted polymer dispersed in the alkylsilicone fluid may additionally contain a surfactant selected from the group consisting of anionic and amphoteric surfactants. The surfactant system should provide an acceptable level of foam on the hair and be capable of cleaning the hair, and may comprise one or more water soluble detergents, i.e., an anionic or amphoteric surfactant. Suitable anionic detergents include sulfonated and sulfated alkyl, aralkyl and alkaryl anionic detergents; alkyl succinates; alkyl sulfosuccinates and N-alkyl sarcosinates. Especially preferred are the sodium, magnesium, ammonium, and the mono-, di- and triethanolamine salts of alkyl and aralkyl sulfates as well as the salts of alkaryl sulfonates. The alkyl groups of the detergents generally have a total of from about 12 to 21 carbon atoms, may be unsaturated, and are preferably fatty alkyl groups. The sulfates may be sulfate ethers containing one to ten ethylene oxide or propylene oxide units per molecule. Preferably, the sulfate ethers contain 2 to 3 ethylene oxide units.

Typical anionic detergents include, among others, sodium lauryl sulfate, sodium lauryl ether sulfate, ammonium lauryl sulfate, triethanolamine lauryl sulfate, sodium C14-16 olefin sulfonate, ammonium pareth-25 sulfate (ammonium salt of a sulfated polyethylene glycol ether of a mixture of synthetic C12-15 fatty alcohols), sodium myristyl ether sulfate, ammonium lauryl ether sulfate, disodium monooleamidosulfosuccinate, ammonium lauryl sulfosuccinate, sodium dodecylbenzene sulfonate, triethanolamine dodecylbenzene sulfonate and sodium N-lauroyl sarcosinate. The most preferred anionic detergents are the lauryl sulfates, particularly monoethanolamine, triethanolamine, ammonium and sodium lauryl sulfates. Sodium lauryl ether sulfate is also very suitable for use in the compositions in accordance with the present invention.

Surfactants generally classified as amphoteric or ampholytic detergents include, among others, cocoamphocarboxyglycinate, cocoamphocarboxypropionate, cocobetaine, N-cocamidopropyldimethylglycine, and N-lauryl-N-carboxymethyl-N-(2-hydroxyethyl)ethylenediamine. Other suitable amphoteric detergents include the quaternary cycloimidates, betaines such as alpha-(tetradecyldimethylammonio)acetate, beta-(hexadecyldiethylammonio)propionate, and gamma-(dodecyldimethylammonio)butyrate, and sultaines such as 3-(dodecyldimethylammonio)-propane-1-sulfonate, and 3-(tetradecyldimethylammonio)ethane-1-sulfonate.

The compositions of this invention may contain a nonionic surfactant. The nonionic surfactants of the present invention are selected from the group consisting of fatty acid alkanolamide and amine oxide surfactants. The fatty acid alkanolamides are nonionic surfactants obtained by reacting alkanolamines such as monoethanolamine, diethanolamine, monoisopropanolamine, or diisopropanolamine with a fatty acid or fatty acid ester to form the amide. The hydrophobic portion of the nonionic surfactant is provided by a fatty acid hydrocarbon chain which generally has from 10 to 21 carbon atoms. The fatty acid alkanolamide surfactants include, for example, fatty acid diethanolamides such as isostearic acid diethanolamide, lauric acid diethanolamide, capric acid diethanolamide, coconut fatty acid diethanolamide, linoleic acid diethanolamides, myristic acid diethanolamide, oleic acid diethanolamide, and stearic acid diethanolamide; fatty acid monoethanolamides such as coconut fatty acid monoethanolamide; and fatty acid monoisopropanolamides such as oleic acid monoisopropanolamide and lauric acid monoisopropanolamide.

The amine oxides are well known nonionic surfactants usually obtained by oxidizing a tertiary amine to form the amine oxide. They are sometimes also referred to as polar nonionic surfactants. Amine oxide surfactants include, for example, the N-alkyl amine oxides such as N-cocodimethylamine oxide, N-lauryl dimethylamine oxide, N-myristyl dimethylamine oxide, and N-stearyl dimethylamine oxide; the N-acyl amine oxides such as N-cocamidopropyl dimethylamine oxide and N-tallowamidopropyl dimethylamine oxide; and N-alkoxyalkyl amine oxides such as bis(2-hydroxyethyl) C12-15 alkoxy-propylamine oxide. The hydrophobic portion of the amine oxide surfactants is generally provided by a fatty hydrocarbon chain containing from 10 to 21 carbon atoms.

For purposes of this invention the alkanolamide and amine oxide surfactants are preferred. In general, the fatty acid diethanolamides and N-alkyl dimethylamine oxides are preferred for use in the compositions. Especially preferred are the fatty acid diethanolamides and N-alkyl dimethylamine oxides where the fatty hydrocarbon chain contains from 10 to 18 carbon atoms. For example, especially preferred nonionic surfactants include lauric acid diethanolamide, N-lauryl dimethylamine oxide, coconut acid diethanolamide, myristic acid diethanolamide, and oleic acid diethanolamide.

Additional categories of surfactant materials may also be included such as cationic and zwitterionic surfactants, and representative compounds are set forth in detail in U.S. Pat. No. 4,902,499, issued Feb. 20, 1990, which is considered to be incorporated herein by reference.

Other adjuvants may be added to compositions in accordance with the present invention comprising a blend of the diluted polymer dispersed in the alkylsilicone fluid include for example thickeners, perfumes, colorants, electrolytes, pH control ingredients, foam boosters and foam stabilizers, antimicrobials, antioxidants, ultraviolet light absorbers and medicaments. For example, it is sometimes preferred to employ a thickener in the compositions to facilitate the hand application of the composition to the hair. Thickeners are preferably used in sufficient quantities to provide a more luxurious effect. For example, viscosities within the range of 6,000 to 12,000 mPa·s measured at 25° C. Suitable thickeners, include, among others, sodium alginate, gum arabic, polyoxyethylene, guar gum, hydroxypropyl guar gum, cellulose derivatives such as methylcellulose, methylhydroxypropylcellu lose, hydroxypropylcellu lose, polypropylhydroxyethylcellu lose, starch and starch derivatives such as hydroxyethylamylose, and starch amylose, locust bean gum, electrolytes such as sodium or ammonium chloride, saccharides such as fructose and glucose, and derivatives of saccharides such as PEG-120 methyl glucose dioleate.

The perfumes which can be used in the compositions are cosmetically acceptable perfumes. Colorants are used to confer a color to the composition and may generally be used. Although not required, it is preferred to employ an acid to adjust the pH within the range of 5 to 9 or more preferably within the range of 6 to 8 in the compositions of this invention. Any water soluble acid such as a carboxylic acid or a mineral acid is suitable. For example, suitable acids include mineral acids such as hydrochloric, sulfuric, and phosphoric, monocarboxylic acids such as acetic acid, lactic acid, or propionic acid; and polycarboxylic acids such as succinic acid, adipic acid and citric acid.

If for special purposes additional conditioners are desired, they may be added. For example, any of the well-known organic cationic hair conditioning components may be added. Some cationic conditioning components that may be used in the present invention to provide hair grooming include quaternary nitrogen derivatives of cellulose ethers, homopolymers of dimethyldiallyl-ammonium chloride, copolymers of acrylamide and dimethyldiallylammonium chloride, homopolymers or copolymers derived from acrylic acid or methacrylic acid containing cationic nitrogen functional groups attached to the polymer via ester or amide linkages, polycondensation products of N,N'-bis-(2,3-epoxypropyl)-piperazine or of piperazine-bis-acrylamide and piperazine, poly-(dimethylbutenylammonium chloride)-.alpha.,.omega.-bis-(triethanol-ammonium) chloride, and copolymers of vinylpyrrolidone and acrylic acid esters with quaternary nitrogen functionality. The above cationic organic polymers and others are described in more detail in U.S. Pat. No. 4,240,450 which is hereby incorporated by reference to further describe the cationic organic polymers. Other categories of conditioners such as monomeric quaternary amine salts may also be employed.

A preservative may be required and representative preservatives which may be employed include about 0.1-0.2 weight percent of compounds such as formaldehyde, dimethyloldimethylhydantoin, 5-bromo-5-nitro-1,3-dioxane, methyl- and propyl para-hydroxybenzoates, and mixtures of such benzoates with sodium dehydroacetate, sorbic acid, and imidazolidinyl urea.

Compositions in accordance with the present invention comprising a blend of the diluted polymer dispersed in the alkylsilicone fluid may additionally contain may also be formulated to include dyes, colorants, reducing agents, neutralizing agents, and preservatives, necessary for their application as permanent wave systems or hair dyes, for example. The active formulation can be applied in several different forms including lotions, gels, mousses, aerosols, and pump sprays, for example, and as conditioners and shampoos. The active ingredient may include a carrier, and suitable carrier fluids for hair care formulations are water as well as, for example, such fluids as alcohols namely ethanol or isopropanol, hydrocarbons and halogenated hydrocarbons as mineral spirits and trichloroethane, cyclic siloxanes, and aerosol propellants.

When the composition is intended for aerosol application, propellant gases can be included such as carbon dioxide, nitrogen, nitrous oxide, volatile hydrocarbons such as butane, isobutane, or propane and chlorinated or fluorinated hydrocarbons such as dichlorodifluoromethane and dichlorotetrafluoroethane or dimethylether.

Resulting products may be in the form of ointments, creams, gels, pastes, foams, aerosols and the like. They may be present in pharmaceutical, medical and/or therapeutic applications analgesic; anesthetic; anti-acne; antibacterial; anti-yeast; antifungal; antivirals; antidandruff; antidermatitis; antipruritic; antiemetic; anti-motion sickness; anti-inflammatory; antihyperkeratolytic; anti-dry skin; antiperspirant; antipsoriatic; antiseborrheic; hair conditioning; hair treatment; anti-aging; antiwrinkle; anti-asthmatic; bronchodilator; sunscreen; antihistamine; skin-lightening; depigmenting; wound-healing; vitamin; corticosteroid; tanning or hormonal. Products of this type are commonly used include hair care products such as shampoos, hair conditioners, hair colorants, hairstyling preparations, such as setting lotions and hairsprays and permanent wave preparations, skin care products such as facial or body powders, blushers, eyeshadows, eyeliners, bath grains or pellets, lipsticks, moisturisers, cosmetics, hand and body lotions, concealers, compact powders, foundations and sun care products such as sun screen formulations In a still further embodiment of the present invention a diluted polymer in accordance with the present invention may be incorporated into a high viscosity silicone rubber composition In accordance with the present invention there is provided a method of making a silicone rubber composition comprising the steps of:—

Preparing a diluted organopolysiloxane containing polymer as hereinbefore described optionally with an alkenyl group, condensable group, silyl-hydride or trimethylsilyl containing end-blocker and a siloxane based diluent; compounding the resulting diluted organopolysiloxane containing polymer with
    one or more reinforcing and/or non reinforcing fillers and
    a curing agent.

In the present embodiment any filler or combination of fillers as hereinbefore described may be utilised. Usually the filler content of the composition will reside within the range from about 5 to about 200 parts by weight per 100 parts by weight of the polymer excluding the diluent portion.

A curing agent, as noted above, is required and compounds which can be used herein include organic peroxides such as dialkyl peroxides, diphenyl peroxides, benzoyl peroxide, 1,4-dichlorobenzoyl peroxide, 2,4-dichlorobenzoyl peroxide, di-t-butyl peroxide, dicumyl peroxide, tertiary butyl-perbenzoate, monochlorobenzoyl peroxide, ditertiary-butyl peroxide, 2,5-bis-(tertiarybutyl-peroxy)-2,5-dimethylhexane, tertiary-butyl-trimethyl peroxide, tertiary-butyl-tertiary-butyl-tertiary-triphenyl peroxide, 1,1-bis(t-butylperoxy)-3,3,5-trimethylcyclohexane, and t-butyl perbenzoate. The most suitable peroxide based curing agents are benzoyl peroxide, 2,4-dichlorobenzoyl peroxide, di-t-butyl peroxide, and dicumyl peroxide. Such organic peroxides are used at up to 10 parts per 100 parts of the combination of polymer, filler and optional additives. Preferably between 0.2 and 2 parts of peroxide are used.

The present compositions can also be cured and/or cross-linked by a hydrosilylation reaction catalyst in combination with an organohydrogensiloxane as the curing agent instead of an organic peroxide, providing a majority of polymer molecules which contain at least two unsaturated groups suitable for cross-linking with the organohydrogensiloxane. These groups are typically alkenyl groups, most preferably vinyl groups. To effect curing of the present composition, the organohydrogensiloxane must contain more than two silicon bonded hydrogen atoms per molecule. The organohydrogensiloxane can contain, for example, from about 4-20 silicon atoms per molecule, and have a viscosity of up to about 10 Pa·s at 25° C. The silicon-bonded organic groups present in the organohydrogensiloxane can include substituted and unsubstituted alkyl groups of 1-4 carbon atoms that are otherwise free of ethylenic or acetylenic unsaturation. For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Preferably the hydrosilylation catalyst chosen may comprise any suitable hydrosilylation catalyst such as a platinum group metal based catalyst selected from a platinum, rhodium, iridium, palladium or ruthenium catalyst. Platinum group metal containing catalysts useful to catalyse curing of the present compositions can be any of those known to catalyse reactions of silicon bonded hydrogen atoms with silicon bonded alkenyl groups. The preferred platinum group metal for use as a catalyst to effect cure of the present compositions by hydrosilylation is a platinum based catalyst. Some preferred platinum based hydrosilylation catalysts for curing the present composition are platinum metal, platinum compounds and platinum complexes. Representative platinum compounds include chloroplatinic acid, chloroplatinic acid hexahydrate, platinum dichloride, and complexes of such compounds containing low molecular weight vinyl containing organosiloxanes. Other hydrosilylation catalysts suitable for use in the present invention include for example rhodium catalysts such as $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX^4{}_3[(R^3)_2S]_3$, $(R^2{}_3P)_2Rh(CO)X^4$, $(R^2{}_3P)_2Rh(CO)H$, $Rh_2X^4{}_2Y^2{}_4$, $H_aRh_b\text{olefin}_cCl_d$, $Rh(O(CO)R^3)_{3-n}(OH)_n$ where $X^4$ is hydrogen, chlorine, bromine or iodine, $Y^2$ is an alkyl group, such as methyl or ethyl, CO, $C_8H_{14}$ or 0.5 $C_8H_{12}$, $R^3$ is an alkyl radical, cycloalkyl radical or aryl radical and $R^2$ is an alkyl radical an aryl radical or an oxygen substituted radical, a is 0 or 1, b is 1 or 2, c is a whole number from 1 to 4 inclusive and d is 2, 3 or 4, n is 0 or 1. Any suitable iridium catalysts such as $Ir(OOCCH_3)_3$, $Ir(C_5H_7O_2)_3$, $[Ir(Z^4)(En)_2]_2$, or $(Ir(Z^4)(Dien)]_2$, where $Z^4$ is chlorine, bromine, iodine, or alkoxy, En is an olefin and Dien is cyclooctadiene may also be used.

The hydrosilylation catalyst may be added to the present composition in an amount equivalent to as little as 0.001 part by weight of elemental platinum group metal, per one million parts (ppm) of the composition. Preferably, the concentration of the hydrosilylation catalyst in the composition is that capable of providing the equivalent of at least 1 part per million of elemental platinum group metal. A catalyst concentration providing the equivalent of about 3-50 parts per million of elemental platinum group metal is generally the amount preferred.

The curing agent may alternatively be a condensation reaction catalyst because the present compositions may alternatively be cured and/or cross-linked by a condensation reaction in combination with a siloxane and/or silane cross-linker having at least two and preferably at least three groups reactable with hydroxyl or hydrolysable groups provided a majority of polymer molecules contain at least two condensable groups as hereinbefore described suitable for reaction with said cross-linker.

Optional additives for a high consistency rubber composition may comprise one or more of the following rheology modifiers, pigments, colouring agents, anti-adhesive agents adhesion promoters, heat stabilisers, blowing agents, flame retardants, electrically and/or thermally conductive fillers, and desiccants, each of which are preferably as hereinbefore described.

Other optional ingredients which may be incorporated in the composition of a high consistency silicone rubber include handling agents, peroxide cure co-agents, acid acceptors, and UV stabilisers.

Handling agents are used to modify the uncured properties of the silicone rubber such as green strength or processability sold under a variety of trade names such as SILASTIC® HA-1, HA-2 and HA-3 sold by Dow Corning corporation)

Peroxide cure co-agents are used to modify the properties, such as tensile strength, elongation, hardness, compression set, rebound, adhesion and dynamic flex, of the cured rubber. These may include di- or tri-functional acrylates such as Trimethylolpropane Triacrylate and Ethylene Glycol Dimethacrylate; Triallyl Isocyanurate, Triallyl Cyanurate, Polybutadiene oligomers and the like. Silyl-hydride functional siloxanes may also be used as co-agents to modify the peroxide catalysed cure of siloxane rubbers.

The acid acceptors may include Magnesium oxide, calcium carbonate, Zinc oxide and the like.

The ceramifying agents can also be called ash stabilisers and include silicates such as wollastonite.

The silicone rubber composition in accordance with this embodiment may be made by any suitable route, for example one preferred route is to first make a silicone rubber base by heating a mixture of fumed silica, a treating agent for the silica, and the diluted organopolysiloxane containing polymer of the present invention. The silicone rubber base is removed from the first mixer and transferred to a second mixer where generally about 150 parts by weight of a non-reinforcing or extending filler such as ground quartz is added per 100 parts by weight of the silicone rubber base. Other additives are typically fed to the second mixer such as curing agents, pigments and colouring agents, heat stabilizers, anti-adhesive agents, plasticizers, and adhesion promoters. In a second preferred route the diluted organopolysiloxane containing polymer of the present invention and any desired filler plus any desired treating agent are fed into a reactor and mixed, further additives as described above including cure agents are then fed into the same reactor and further mixed.

Other potential applications of the present invention include use of the diluted organopolysiloxane containing polymer in hot melt adhesives, pressure sensitive adhesives, in encapsulants for solar cells and any other applications requiring the use of organopolysiloxane gums.

The invention will now be described by way of Example. For the sake of comparison the diluent used in all the examples and comparative examples unless otherwise indicated was HYDROSEAL® G250H, a hydrotreated mineral oil cut (n-para 7%/iso-para 51% and naphthenic 42%) produced by Total Fina. Unless otherwise stated all viscosities provided were measured at 25° C.

EXAMPLE 1

The polymer was produced in a laboratory batch reactor having a mixing paddle which mixes a mixture at the same rate (in the following example 179 revolutions per minute (RPM) continuously by varying the power in line with the change in viscosity and thereby using the following procedure:

0.42 kg of dimethylhydroxy terminated polydimethylsiloxane (70 mPa·s) and was introduced into the mixer and stirred sequentially adding 21 g of DBSA catalyst and 0.56 kg of diluent while continuing stirring at 179 RPM. The viscosity of the resulting polymer was tracked by measuring the current (mA) required to maintaining the paddle rotation speed of 179 RPM. Mixing was continued until the viscosity began to drop at which point the catalyst was neutralised with an amine (e.g. 0.5-1.0% triethanolamine).

It is believed the polymerisation process using an acid such as DBSA occurs via a two step mechanism involving the initial activation of free silanol groups by the catalyst subsequent to which the activated silanol group undergoes a condensation reaction with an unactivated silanol group to form an —Si—O—Si— bond.

The variation of viscosity with time (min) was compared with respect to temperature and concentration of catalyst utilised in the polymerisation process. Tables 1a and 1b respectively show the viscosity time relationship seen at 25° C. for the silicone phase (Table 1a) and the mixture (Table 1b) It will be appreciated that the starting viscosity is significantly lower when diluent is present and remains significantly lower throughout the polymerisation process for the same reason. However, the presence of diluent in the starting mixture provides a means of introducing a much higher loading of diluent than would previously had been possible under prior processes.

The viscosity profiles observed in example 1 generally show that the viscosity reaches a plateau viscosity after which either no further increase is observed or a gradual decrease in viscosity occurs. The lower values in the above Table e.g. 38 indicate that the viscosity is below the detectable level of the viscosity measuring equipment utilised. Hence it can be seen that the use of 0.5% DBSA only resulted in low levels of polymerisation in both the absence (Table 1a) and presence (Table 1b) of the diluent. It will also be seen that the viscosity reaches a peak and then falls off. It is believed that this may be because of the increasing presence of water generated as a by-product of the condensation reaction, in that once a critical level of water has been produced a depolymerisation process occurs, due to the interaction of the catalyst and water, at a significantly greater rate than the rate of polymerisation and as such quenching of the catalyst is important factor in the viscosity of the polymers produced using this polymerisation process.

TABLE 1a

| Time (Min) | Polymer viscosity (mPa·s) 0.5% DBSA | Polymer viscosity (mPa·s) 1.0% DBSA | Polymer viscosity (mPa·s) 1.5% DBSA | Polymer viscosity (mPa·s) 2.0% DBSA |
|---|---|---|---|---|
| 0 | 850 | 850 | 850 | 850 |
| 5 | 850 | 850 | 734634 | 3511458 |
| 10 | 850 | 20123 | 2141048 | 6855597 |
| 15 | 850 | 214624 | 3909870 | 7871626 |
| 20 | 850 | 308612 | 4867939 | 6927003 |
| 25 | 850 | 446118 | 6013020 | 6013006 |
| 30 | 850 | 576236 | 6891305 | 5131976 |
| 35 | 850 | 694139 | 7070419 | 4639799 |
| 40 | 850 | 796469 | 7214520 | 4446417 |
| 45 | 850 | 902241 | 7142379 | 4034560 |
| 50 | 850 | 1146094 | 7178428 | 3847875 |
| 55 | 20123 | 1238289 | 7106373 | 3632893 |
| 60 | 20123 | 1356076 | 7250663 | 3391047 |

TABLE 1b

| Time (Min) | Polymer/Ext' viscosity (mPa·s) 0.5% DBSA | Polymer/Ext' viscosity (mPa·s) 1.0% DBSA | Polymer/Ext' viscosity (mPa·s) 1.5% DBSA | Polymer/Ext' viscosity (mPa·s) 2.0% DBSA |
|---|---|---|---|---|
| 0 | 38 | 38 | 38 | 38 |
| 5 | 38 | 38 | 5691 | 18154 |
| 10 | 38 | 395 | 12580 | 29815 |
| 15 | 38 | 2285 | 19660 | 33032 |
| 20 | 38 | 2992 | 23130 | 30045 |
| 25 | 38 | 3932 | 27052 | 27052 |
| 30 | 38 | 4753 | 29930 | 24054 |
| 35 | 38 | 5457 | 30505 | 22321 |
| 40 | 38 | 6043 | 30964 | 21627 |
| 45 | 38 | 6628 | 30735 | 20123 |
| 50 | 38 | 7914 | 30850 | 19429 |
| 55 | 395 | 8382 | 30620 | 18618 |
| 60 | 395 | 8966 | 31079 | 17691 |

EXAMPLE 2

Neutralization of the Catalyst System

As discussed above the DBSA catalyst will cause a depolymerization unless quenched/neutralized. Any suitable base can be used providing it does not denature the polymer. Particularly suitable neutralizers for this system were found to be amines like monoethanolamine (MEA) and triethanolamine (TEA). Alternatives included aluminasilicate zeolite that was found to absorb the DBSA and leave a stable silicone-diluent mix. Table 2 shows viscosity evolution at room temperature of a silicone/diluent blend consisting of 40% silicone and 60% organic diluent that was polymerised with 1.5% DBSA up to 30,000 mPa·s

TABLE 2

| Time (days) | Viscosity (mPa·s) Unneutralised (comparative) | Viscosity (mPa·s) 1.5% zeolite | Viscosity (mPa·s) 0.3% MEA | Viscosity (mPa·s) 0.75% TEA |
|---|---|---|---|---|
| 0  | 29286 | 28370 | 32307 | 30926 |
| 1  | 18876 | 30618 | 31386 | 30976 |
| 4  | 6048  | 31130 | 31693 | 33382 |
| 6  | 4127  | 31127 | 30720 | 30106 |
| 7  | 4019  | 29696 | 31488 | 30515 |
| 8  | 3821  | 30129 | 30452 | 31002 |
| 11 | 2737  | 31334 | 31744 | 31795 |
| 12 | 2521  | 30983 | 31003 | 31002 |
| 13 | 2455  | 30720 | 30566 | 30208 |
| 14 | 2120  | 30651 | 30266 | 29875 |
| 15 | 1958  | 30987 | 29742 | 29123 |

This shows that after neutralisation the polymer viscosity remains constant.

EXAMPLE 3

Gas Phase Chromatography

The molecular weight of a polymer having a viscosity of was 20 000 mPa·s produced in accordance with the process of the present invention containing substantially 60% by weight of diluent and 40% by weight polymer was analysed using gas phase chromatography and compared with a blend of 60% diluent and 40% by weight dimethylhydroxy terminated dimethylpolysiloxane having a viscosity of 80 000 mPa·s (prior to mixing with the diluent). The number averaged molecular weight and polydispersity of the dimethylpolysiloxane phase was 182,200 g/mole and 1.45 respectively for the polymer made in accordance with the present invention and 79300 and 1.57 for the comparative polymer blend indicating that the product of the process in accordance with the present invention has a lower polydispersity, i.e. a smaller molecular weight distribution.

Use of the process described above can lead to the formation of short chain length cyclic polydimethylsiloxanes, the most common being cyclic materials of the formula $(Me_2SiO)_m$ where m is 4 or 5. To assess the level of short chain cyclic impurities a polymer made in accordance with the process of the present invention was analysed using gas chromatography with a Flame Ionisation Detector (FID). It was determined that the resulting polymer contained 0.003 g of cyclic material (where me=4) per gram of polymer and 0.0028 g of cyclic material (where Me=5) per gram of polymer formed in accordance with the present invention.

EXAMPLE 4

Acetoxy Sealant Formulation and Properties

An acetoxy sealant formulation was prepared using a polymer prepared in accordance with the method of the present invention and the physical properties were compared with those of a traditionally produced extended acetoxy sealant formulation having a viscosity of 80 000 (mPa·s). Sample 1 is the sample in accordance with the invention (as prepared in Example 1 above) and Comp. 1 is the comparative product tested using a polymer polymerised in the absence of diluent material.

TABLE 4a

Extended Polymer Formulation

|  | Sample 1 |
|---|---|
| Polymer Viscosity (mPa·s) | 19,000 |
| Wt % organopolysiloxane | 39.3 |
| Wt % Diluent | 58.9 |
| Wt % DBSA | 1.5 |
| Wt % Monoethanolamine | 0.3 |

TABLE 4b

Sealant Formulation

|  | Sample 1 | Comp. 1 |
|---|---|---|
| Total Wt % Extended Polymer | 86.385 |  |
| Wt % dimethylhydroxysilyl terminated organopolysiloxane (blended with diluent subsequent to polymerisation |  | 56.385 |
| Wt % Diluent (blended with polymer) | — | 30 |
| Wt % triacetoxysilane | 5 | 5 |
| Wt % Fumed Silica (surface area 150 m²/g (BET)) | 8.6 | 8.6 |
| Dibutyltin acetate | 0.015 | 0.015 |

Physical Properties of Sealant

Standard physical property tests were undertaken to compare the properties of the two sealant formulations after curing. Adhesion test (1) was carried out to show that a bead of sealant successfully bonded to a standard glass plate after being allowed to cure at 23° C. and 50% relative humidity for 7 days. Adhesion was assessed by subsequent to the curing period the beads were pulled at 90° and the failure was rated as follows:
0: adhesive failure—poor adhesion)
1: boundary or mixed mode (adhesive/cohesive) failure—acceptable adhesion.
2: cohesive failure—excellent adhesion Adhesion test (2) was carried out to show that a bead of sealant successfully bonded to a standard glass plate after being allowed to cure at 23° C. and 50% relative humidity for 7 days and then subsequently 7 days in water. The bead of sealant was pulled as in adhesion test (1).

TABLE 4c

Physical Properties of Sealant

|  | Test Method | Sample 1 | Comp. 1 |
|---|---|---|---|
| Specific Gravity | ASTM D1475-98 | 0.90 | 0.97 |
| Extrusion Rate (g/min) | ASTM D2452-94 | 594 | 700 |
| Tensile Strength (Mpa) | ASTM D412-98a | 1.16 | 2.08 |
| Elongation at Break (%) | ASTM D412-98a | 1098 | 480 |
| Modulus 100% (Mpa) | ASTM D638-97 | 0.13 | 0.44 |
| Hardness (Shore A) | ASTM D2240-97 | 2.00 | 13 |
| Adhesion on glass (1) |  | 2 (PASS) | 2 (PASS) |
| Adhesion on glass (2) |  | 2 (PASS) | 2 (PASS) |

It will be appreciated that the acetoxy sealant made in accordance with the present invention has a number of advantages over the prior art formulation, for example there is a higher diluent content for a similar rheology (50% vs 30%). The mixing process during the preparation of the sealant is significantly simplified because no blending step for blending polymer and diluent is required. The resulting sealant shows an increase in elasticity as can be seen from the elongation at break of greater than 1000%. This sealant formulation enables the use of polymers which would have had substantially unworkable viscosities were it not for the presence of the diluent during the polymerisation process e.g. 3 400 000 mPa·s without any significant handling difficulties and the fact that the resulting uncured sealant composition has a significantly lower specific gravity enables the manufacturer to fill more sealant cartridges or other packages per kg of sealant produced.

EXAMPLE 5

Example 5A

A polymer was produced using the procedure described in example 1 introducing 0.6 kg of dimethylhydroxy terminated polydimethylsiloxane (70 mPa·s) into the mixer, stirring, adding sequentially 30 g of DBSA catalyst and 0.40 kg of trimethyl terminated polydimethylsiloxane (Viscosity=100 mPa·s) as diluent while continuing stirring at 179 RPM. The viscosity of the resulting product was measured as described in Example 1 and rose to 23854 mPa·s after 24 minutes when the DBSA catalyst was neutralized with the addition of 10 g diethanolamine (DEA).

Example 5B

A polymer was produced using the procedure described in example 1 introducing 0.5 kg of dimethylhydroxy silyl terminated polydimethylsiloxane (70 mPa·s) into the mixer, stirring, adding sequentially 3 g of monoethanolamine (in this case utilised as a reaction rate inhibitor), 15 g of sulphuric acid catalyst and 0.50 kg of HYDROSEAL® G250H hydrotreated mineral oil as diluent. The viscosity of the reaction mixture rose to 47209 mPa·s after 21 minutes when the sulphuric acid catalyst was neutralized with 20 g of monoethanolamine.

In the absence of the amine from the initial reaction mixture the reaction was too fast for controlling and monitoring purposes.

Example 5D

A polymer was produced using the procedure described in example 1 introducing 0.5 kg of dimethylhydroxy terminated polydimethylsiloxane (70 mPa·s) into the mixer, stirring, adding sequentially 25 g of DBSA catalyst and 0.50 kg of tetradecylbenzene as diluent. The viscosity of the reaction mixture rose to 26745 mPa·s after 17 minutes when the catalyst was neutralized with 8 g of diethanolamine.

Example 5E

A polymer was produced using the procedure described in example 1 introducing 0.5 kg of dimethylhydroxy terminated polydimethylsiloxane (70 mPa·s) into the mixer, stirring, adding sequentially 2.5 g of phosphonitrile catalyst (30% by weight $[Cl(PCl_2=N)_2PCl_3]^+[PCl_6]^-$ in dichloromethane solvent) and 0.50 kg of HYDROSEAL® G250H hydrotreated mineral oil as diluent. The viscosity rose to 37728 mPa·s in ten minutes when the phosphonitrile catalyst was neutralized with 5 g of monoethanolamine.

EXAMPLE 6

Alkoxy Sealant Formulation and Properties

A diluted polymer was prepared using the method described in example, reaction constituents are listed in table 6a below. The resulting diluted polymer product was then used in the preparation of an alkoxy.sealant formulation (Table 6b). Sample 2 is the sample in accordance with the invention and Comp. 2 is the comparative alkoxy sealant.

TABLE 6a

Polymer Formulation

|  | Sample 2 | Comp. 2 |
|---|---|---|
| Polymer Viscosity (mPa · s) | 19,000 | 50000 |
| Wt % dimethylhydroxysilyl terminated polydimethylsiloxane | 49.1 | 100 |
| Wt % Diluent | 49.1 | — |
| Wt % DBSA | 1.5 | — |
| Wt % Monoethanolamine | 0.3 | — |

TABLE 6b

Sealant Formulation

|  | Sample 2 | Comp. 2 |
|---|---|---|
| Wt % Siloxane | 28.0 | 32.0 |
| Wt % Trimethyl silyl terminated Polydimethylsiloxane (Viscosity = 100 mPa · s) | 0 | 13 |
| Wt % Methyltrimethoxysilane | 2 | 2 |
| Wt % Calcium Carbonate | 69 | 52 |
| Tetra-Tert-Butyl titanate | 1 | 1 |

In the above case the comparative sealant formulation 2 was in the form of a standard alkoxy sealant formulation which typically does not include organic diluents but includes a Trimethyl silyl terminated Polydimethylsiloxane (PDMS) diluent.

Physical Properties of Alkoxy Sealant

Standard physical property tests were undertaken to compare the properties of the two sealant formulations after curing using the same test methods as indicated in Example 4. The adhesion tests carried out were identical to those in Example 4

TABLE 6c

Physical Properties of alkoxy Sealant

|  | Sample 2 | Comp. 2 |
|---|---|---|
| Specific Gravity | 1.54 | 1.50 |
| Extrusion Rate (g/min) | 130 | 200 |
| Tensile Strength (Mpa) | 0.58 | 1.88 |
| Elongation at Break (%) | 760 | 690 |
| Modulus 100% (Mpa) | 0.24 | 0.45 |
| Shore A Hardness | 16.0 | 30.0 |
| Adhesion on glass (1) | 2 (PASS) | 2 (PASS) |
| Adhesion on glass (2) | 2 (PASS) | 2 (PASS) |

Paint Adhesion

The standard crosshatch test was utilised to assess the integrity, i.e. the adhesion of the paint to the sealant surface. Prior to testing a crosshatch was prepared using a scalpel on the painted cured sealant surface. This provides the viewer with a grid of preferably 100 small sections. Two types of adhesive tape, ASTM 03359 and ISO 2409, were applied to different samples or different areas of the same sample. The tapes were then removed to determine which, if any paint was poorly adhered to the sealant surface. This was achieved by studying the adhesive on the tape to determine whether or not any paint had been transferred to the adhesive from the substrate surface. In the above test the lacquer was coated onto a sample of cured sealant (previously allowed to cure for 24 hours) and then was allowed to dry at room temperature for a period of 24 hours.

TABLE 6d

| Paint | Sample 2 | Comp. 2 |
|---|---|---|
| Colores Del Mundo ® Medium 6380 water based satin acrylic lacquer (from Levis of Belgium) | 90% adhesion | 0% adhesion |

Hence, the sealant formulation made from the polymer generated in accordance with the present invention has a number of advantages over the prior art, including a significant reduction in the level of siloxane content in the sealant formulation, the simplified processing (avoidance for the need to blend polymer and diluent after completion of the polymerisation process.

EXAMPLE 7

In this example a composition (A1) is compared with four comparative examples (C1-C4) to show the surprising effect using a polymer prepared in the presence of extender to compound a chalk filled alkoxy sealant with reduced silicone content. Table 7a shows the sealant compositions used.

TABLE 7a

| Ingredients | A1 (wt %) | C1 (wt %) | C2 (wt %) | C3 (wt %) | C4 (wt %) |
|---|---|---|---|---|---|
| Dimethylhydroxy terminated polydimethylsiloxane (70 mPa · s) | 14.13 | — | — | — | — |
| Hydroseal ® G250H | 6.15 | — | 13 | 13 | 13 |
| Silanol terminated silicone polymer 50,000 (mPa · s) | — | 31.5 | 31.5 | 31.5 | 31.5 |
| Trimethyl terminated polydimethylsiloxane (Viscosity 100 mPa · s) | — | 13 | — | — | — |
| Dodecylbenzylsulfonic acid | 0.58 | — | | | |
| Monoethanolamine | 0.14 | — | | | |
| CaCO$_3$ - precipitated - Socal 312 | 38.5 | 28.0 | 28.0 | 26.5 | 26.5 |
| CaCO$_3$ - ground - Mikart | 33.0 | 24.0 | 24.0 | 23.0 | 23.0 |
| Diisoundecylphthalate | 2.5 | — | | | |
| Oleic Acid | | | | 2.5 | |
| diisodecyl adipate | | | | | 2.5 |
| Methyltrimethoxysilane | 3.5 | 2 | 2 | 2 | 2 |
| Diisopropoxytitanium Bis(Ethylacetoacetate) | 1.5 | 1.5 | 1.5 | 1.5 | 1.5 |
| Extended Polymer viscosity (mPa · s) | 20,000 | — | | | |

In Table 7a the comparative formulations (C1-C4) were in the form of a standard chalk filled alkoxy sealant formulations that typically do not contain organic extenders but often contain trimethylsilyl terminated polydimethylsiloxane (PDMS) as a plasticizer. The polymer utilised in A1 was produced in using the same process as in Example 1 above using the following procedure to obtain 1000 g of polymer: 676 g of dimethylhydroxy terminated polydimethylsiloxane (70 mPa·s) was introduced into the mixer and stirred sequentially adding 28 g of DBSA catalyst and 289 g of extender. The viscosity of the polymer was tracked as described in Example 1 above. Mixing was continued until the viscosity began to drop at which point the catalyst was neutralized with by the addition of 6.7 g of monoethanolamine.

The resulting extended polymer had a viscosity of 20 000 mPa·s and was then blended with the other ingredients in the amounts indicated in Table 7a to form the A1 sealant composition. C1 to C4 were blended using a traditional unextended polymer to make the compositions indicated in Table 7a The resulting compounded sealants were then allowed to cure for a week at 23° C. and 50% relative humidity prior to analysis of their cure properties and mechanical properties (Table 7b).

TABLE 7b

| Standards properties | Methods | A1 | C1 | C2 | C3 | C4 |
|---|---|---|---|---|---|---|
| Tack Free Time (min) | ASTM D2377-94 | 14 | 35 | 14 | 11 | 15 |
| Cure in Depth 24 hr (mm/24 hr) | | 1.2 | 2 | 2.2 | — | — |
| Tensile Strength (MPa) | ASTM D412-98a | 0.4 | 1.88 | 1.66 | 0.60 | 1.11 |
| Elongation at break (%) | ASTM D412-98a | 275 | 690 | 622 | 764 | 602 |
| 100% modulus (MPa) | ASTM D638-97 | 0.41 | 0.45 | 0.59 | 0.10 | 0.33 |
| Hardness (Shore A) | ASTM D2240-97 | 40 | 30 | 27 | 5 | 15 |
| Adhesion on glass (1) | | | 2 (pass) | 2 (pass) | | |
| Adhesion on glass (2) | | | 2 (pass) | 2 (pass) | | |

The cure in depth tests were undertaken to determine how far below the surface the sealant had hardened in 24 hours by filling a suitable container (avoiding the introduction of air pockets) with sealant, curing the sealant contained in the container for the appropriate period of time at room temperature (about 23° C.) and about 50% relative humidity. After the appropriate curing time the sample is removed from the container and the height of the cured sample is measured. All other tests were as hereinbefore described unless otherwise indicated.

The sealants prepared and cured were also analysed for paintability using the test described in Example 6 above. It was determined that in the case of the C1-C4 formulations as will be seen in Table 6c the paint did not properly disperse on the surface of the sealant.

TABLE 6c

| Paint | A1 | C1 | C2 | C3 | C4 |
|---|---|---|---|---|---|
| LEVIS ® - Colores del mundo water based - 5309 Bali vert | 0% | No Disp. | No Disp. | No Disp. | No Disp. |
| LEVIS ® - ambiance mur water based - 9550 mauve | 0% | 100% | 94% | No Disp. | No Disp. |
| DE KEYN ® - laque intérieur/extérieur water based - 699 rouge | 0% | No Disp. | No Disp. | No Disp. | No Disp. |
| EXCELLENCE ® (Briko depot) - peinture plastice water based - vert printemps | 0% | No Disp. | 50% | No Disp. | 100% |
| BRIKOBI ® - laque acrylique brillante water based - B51 bleu ciel | 0% | No Disp. | No Disp. | No Disp. | No Disp. |

As will be seen from Table 7c the inventors obtained surprising results in that whilst comparative compositions C1-C4 gave poor paintability results for both water-based and solvent-based paints composition A1 gave good results for water based paints but equally poor paintability results for solvent based paints.

EXAMPLE 8

80 parts by weight of a dimethylhydroxysilyl end-blocked polydimethylsiloxane, Mn=2400, Viscosity ~70 mPa·s) was mixed with 20 parts by weight of a trimethylsilyl end-blocked polydimethylsiloxane diluent, (Viscosity 60,000 mPa·s) and charged to a Brabender plasticorder mixer. 4 parts by weight of DBSA (based on the. total siloxane content, was then added and well mixed. After 90 minutes at room temperature, the reaction was neutralised with Magnesium Oxide and analysed by Gel Permeation Chromatography. The product was found to have Mn=123000, Mw=261000 as determined following ASTM D5296-05 (and calculated as polystyrene molecular weight equivalents).

Preparation of a Treated Kaolin Filled Silicone Rubber

To the product of polymerisation process above 100 parts by weight was added 100 parts by weight of a methyltri-methoxysilane treated calcined Kaolin The mixture was mixed in a Brabender plasticorder mixer at 20 rpm for 90 minutes. The resulting product was cooled and mixed with 2 phr of a paste of Dichlorobenzoyl peroxide 50 parts in silicone oil on a two roll mill and cured 5 minutes at 116° C. followed by a 4 hour post cure at 200° C. to give a test sheet which was tested according to the following procedures.

TABLE 8a

| | | |
|---|---|---|
| Tensile Strength (MPa) | (ISO 37: 1994 Type 2) | 4.5 |
| Elongation at Break (%) | (ISO 34: 1994 Type 2) | 260 |
| Hardness (Shore A) | (BS ISO EN 868: 2003) | 27 |
| Tear (kN/m) | (ASTM 624 -98, Die B) | 14.6 |

The invention claimed is:

1. A method of making a linear diluted polysiloxane containing polymer comprising the steps of:
   i) preparing a linear polysiloxane containing polymer by the polycondensation of siloxane containing oligomers which comprise condensable groups in the presence of an organic based extender or plasticiser, a suitable catalyst and an end-blocking agent; and
   ii) where required quenching the polymerisation process;
   wherein the organic based extender or plasticiser is substantially retained within the resulting linear diluted organopolysiloxane; and
   wherein the organic based extender or plasticiser is selected from one or more of the group comprising
   linear or branched mono unsaturated hydrocarbons; and
   mineral oil fractions comprising linear (n-paraffinic) mineral oils, branched (iso-paraffinic) mineral oils, cyclic (naphthenic) mineral oils, and mixtures thereof.

2. A method in accordance with claim 1 wherein the polymerisation product has the general formula $$X^3\text{-A-}X^1$$

where $X^3$ and $X^1$ are independently selected from siloxane groups which terminate in hydroxyl or hydrolysable groups and A is a siloxane containing polymeric chain, said hydroxyl-terminating or hydrolysable groups $X^3$ or $X^1$ being selected from —Si(OH)$_3$, —(R$^a$)Si(OH)$_2$, —(R$^a$)$_2$SiOH, —R$^a$Si(OR$^b$)$_2$, —Si(OR$^b$)$_3$, —R$^a{}_2$SiOR$^b$ or —R$^a{}_2$Si—R$^c$—SiR$^d{}_p$(OR$^b$)$_{3-p}$ where each R$^a$ independently represents a monovalent hydrocarbyl group; each R$^b$ and R$^d$ group is independently an alkyl or alkoxy group in which the alkyl groups suitably have up to 6 carbon atoms; R$^c$ is a divalent hydrocarbon group which may be interrupted by one or more siloxane spacers having up to 6 silicon atoms; and p has the value 0, 1 or 2.

3. A method in accordance with claim 1 wherein the polymerisation process is a polycondensation polymerisation process in which a linear and/or branched organopolysiloxane having hydrolysable terminal groups is polymerised in the presence of a condensation catalyst selected from
   (i) a catalyst of the general formula R$^{20}$SO$_3$H in which R$^{20}$ represents an alkyl group, an aryl or an alkaryl group;
   (ii) a phosphonitrile halide catalyst;
   (iii) phosphonitrile halide ion based catalysts;
   (iv) a titanate and/or zirconate;
   (v) protic acids;
   (vi) Lewis acids;
   (vii) organic and inorganic bases;
   (viii) borates; and
   (ix) boranes.

4. A method in accordance with claim 3 wherein the catalyst is dodecylbenzenesulphonic acid quenched by a mono/di and trialkanolamine or an aluminasilicate zeolite.

5. A method in accordance with claim 1 wherein the extender or plasticiser is at least substantially miscible with the oligomer and the polymer.

6. A linear diluted organopolysiloxane polymer formed from the method in accordance with claim 1.

7. A linear diluted organopolysiloxane polymer in accordance with claim 5 wherein the polymer has the general formula $$X^3\text{-A-}X^1$$

where $X^3$ and $X^1$ are independently selected from silyl groups which terminate in hydroxyl or hydrolysable groups selected from —Si(OH)$_3$, —(R$^a$)Si(OH)$_2$, —(R$^a$)$_2$SiOH, —R$^a$Si(OR$^b$)$_2$, —Si(OR$^b$)$_3$, —R$^a{}_2$SiOR$^b$ and —R$^a{}_2$Si—R$^c$—SiR$^d{}_p$(OR$^b$)$_{3-p}$ where each R$^a$ independently represents a monovalent hydrocarbyl group, each R$^b$ and R$^d$ group is independently an alkyl or alkoxy group in which the alkyl groups suitably have up to 6 carbon atoms; R$^c$ is a divalent hydrocarbon group which may be interrupted by one or more siloxane spacers having up to 6 silicon atoms; and p has the value 0, 1 or 2; and A is a siloxane containing molecular chain.

8. A method of making a moisture curable composition capable of cure to an elastomeric body comprising the steps of forming the linear diluted organopolysiloxane polymer in accordance with the steps of claim 1 and mixing the linear diluted organopolysiloxane polymer with a suitable cross-linking agent which is reactive with the linear organopolysiloxane polymer, a suitable condensation catalyst and optionally filler.

9. A method of making a moisture curable composition capable of cure to an elastomeric body in accordance with claim 8 wherein the cross-linking agent is one or more silane or siloxane which contain acyloxy groups and/or ketoximino groups, and the catalyst is a tin catalyst.

10. A method of making a moisture curable composition capable of cure to an elastomeric body in accordance with claim 8 wherein the cross-linking agent is one or more silane or siloxane which contain alkoxy groups and alkenyloxy groups, and the catalyst is a titanate or zirconate or a chelated titanate or chelated zirconate.

11. A method of making a moisture curable composition capable of cure to an elastomeric body in accordance with claim 8 wherein the filler comprises one or more finely divided, reinforcing fillers selected from the group of high surface area fumed silica, precipitated silica, and calcium carbonate, and/or one or more extending fillers selected from the group of crushed quartz, diatomaceous earth, barium sulphate, iron oxide, titanium dioxide, carbon black, talc, and wollastonite.

12. A composition comprising a diluted organopolysiloxane formed from the method of claim 1 wherein the organic based extender or plasticiser is added to the composition immediately after the polycondensation reaction has commenced or sequentially during polymerisation, and wherein the organic based extender or plasticiser is substantially retained within the linear diluted organopolysiloxane.

13. A method of making a silicone rubber composition comprising the steps of:
preparing a linear diluted organopolysiloxane containing polymer in accordance with the method of claim 1 optionally containing an alkenyl group, a condensable group, a silyl-hydride or trimethylsilyl containing end-blocker, and a siloxane based extender or plasticiser; and
compounding the resulting linear diluted organopolysiloxane polymer with one or more reinforcing and/or non reinforcing fillers and a curing agent; and optional additives selected from the group of one or more rheology modifiers, pigments, colouring agents, anti-adhesive agents, adhesion promoters, blowing agents, fire retardants and dessicants,
wherein the organic based extender or plasticiser is substantially retained within the linear diluted organopolysiloxane.

14. A method in accordance with claim 13 wherein the curing agent is one or more organic peroxides selected from the group of dialkyl peroxides, diphenyl peroxides, benzoyl peroxide, 1,4-dichlorobenzoyl peroxide, 2,4-dichlorobenzoyl peroxide, di-t-butyl peroxide, dicumyl peroxide, tertiary butyl-perbenzoate, monochlorobenzoyl peroxide, ditertiary-butyl peroxide, 2,5-bis-(tertiarybutyl-peroxy)-2,5-dimethyl-hexane, tertiary-butyl-trimethyl peroxide, tertiary-butyl-tertiary-butyl-tertiary-triphenyl peroxide, and t-butyl perbenzoate.

15. A method in accordance with claim 13 wherein the polymer comprises unsaturated groups and the curing agent is a hydrosilylation reaction catalyst in combination with an organohydrogensiloxane.

16. A method in accordance with claim 15 wherein the organohydrogensiloxane comprises from 4-20 silicon atoms per molecule, and has a viscosity of up to about 10 Pa·s at 25° C.

17. A method in accordance with claim 15 wherein the hydrosilylation catalyst is a platinum group metal based catalyst selected from a platinum, rhodium, iridium, palladium or ruthenium catalyst.

18. A moisture curable composition capable of cure to an elastomeric body, the composition comprising:
a. a linear organopolysiloxane having not less than two silicon-bonded hydroxyl or hydrolysable groups that is diluted in an organic based extender or plasticiser;
b. a siloxane and/or silane cross-linker having at least two groups per molecule which are reactable with the hydroxyl or hydrolysable groups in the diluted organopolysiloxane;
c. one or more fillers; and
d. a suitable cure catalyst,
wherein the organic based extender or plasticiser is substantially retained within the linear diluted organopolysiloxane and is selected from the group comprising linear or branched mono unsaturated hydrocarbons; and mineral oil fractions comprising linear (n-paraffinic) mineral oils, branched (iso-paraffinic) mineral oils, cyclic (naphthenic) mineral oils, and mixtures thereof.

19. A composition in accordance with claim 18 additionally comprising one or more surfactants, detergents, thickeners, perfumes, colorants, electrolytes, pH control ingredients, foam boosters and foam stabilizers, antimicrobials, antioxidants, ultraviolet light absorbers and medicaments dyes, reducing agents, neutralizing agents, and preservatives.

20. A method of making a linear diluted polysiloxane containing polymer comprising the steps of:
i) preparing a linear polysiloxane containing polymer by the polycondensation of siloxane containing oligomers which comprise condensable groups in the presence of an organic based extender or plasticiser, a suitable catalyst and optionally an end-blocking agent; and
ii) where required quenching the polymerisation process;
wherein the organic based extender or plasticiser is substantially retained within the resulting linear diluted organopolysiloxane; and
wherein the organic based extender or plasticiser is selected from one or more of the group of
polyisobutylenes (PIB),
phosphate esters, polyalkylbenzenes, and
linear and/or branched alkylbenzenes esters of aliphatic monocarboxylic acids.

21. A method in accordance with claim 20 wherein the polymerisation product has the general formula $$X^3\text{-}A\text{-}X^1$$

where $X^3$ and $X^1$ are independently selected from siloxane groups which terminate in hydroxyl or hydrolysable groups and A is a siloxane containing polymeric chain, said hydroxyl-terminating or hydrolysable groups $X^3$ or $X^1$ being selected from $-Si(OH)_3$, $-(R^a)Si(OH)_2$, $-(R^a)_2SiOH$, $-R^aSi(OR^b)_2$, $-Si(OR^b)_3$, $-R^a_2SiOR^b$ or $-R^a_2Si-R^c-SiR^d_p(OR^b)_{3-p}$ where each $R^a$ independently represents a monovalent hydrocarbyl group; each $R^b$ and $R^d$ group is independently an alkyl or alkoxy group in which the alkyl groups suitably have up to 6 carbon atoms; $R^c$ is a divalent hydrocarbon group which may be interrupted by one or more siloxane spacers having up to 6 silicon atoms; and p has the value 0, 1 or 2.

22. A method in accordance with claim 20 wherein the polymerisation process is a polycondensation polymerisation process in which a linear and/or branched organopolysiloxane having hydrolysable terminal groups is polymerised in the presence of a condensation catalyst selected from
(i) a catalyst of the general formula $R^{20}SO_3H$ in which $R^{20}$ represents an alkyl group, an aryl or an alkaryl group;
(ii) a phosphonitrile halide catalyst;
(iii) phosphonitrile halide ion based catalysts;
(iv) a titanate and/or zirconate;
(v) protic acids;
(vi) Lewis acids;
(vii) organic and inorganic bases;
(viii) borates; and
(ix) boranes.

23. A method in accordance with claim 22 wherein the catalyst is dodecylbenzenesulphonic acid quenched by a mono/di and trialkanolamine or an aluminasilicate zeolite.

24. A method of making a linear diluted polysiloxane containing polymer comprising the steps of:
i) preparing a linear polysiloxane containing polymer by the polycondensation of siloxane containing oligomers which comprise condensable groups in the presence of an organic based extender or plasticiser, a condensation catalyst selected from a catalyst of the general formula $R^{20}SO_3H$ in which $R^{20}$ represents an alkyl group, an aryl or an alkaryl group;

a phosphonitrile halide catalyst; and a phosphonitrile halide ion based catalyst, and optionally an end-blocking agent; and ii) where required quenching the polymerisation process;

wherein the organic based extender or plasticiser is substantially retained within the resulting linear diluted organopolysiloxane; and wherein the organic based extender or plasticiser is selected from one or more of the group comprising linear or branched mono unsaturated hydrocarbons; and mineral oil fractions comprising linear (n-paraffinic) mineral oils, branched (iso-paraffinic) mineral oils, cyclic (naphthenic) mineral oils, and mixtures thereof.

25. A method as set forth in claim 24 wherein the condensation catalyst is further defined as dodecylbenzenesulphonic acid.

26. A method as set forth in claim 25 wherein the dodecylbenzenesulphonic acid is quenched by a mono/di and trialkanolamine or an aluminasilicate zeolite.

27. A moisture curable composition capable of cure to an elastomeric body, the composition comprising:
  a. a linear organopolysiloxane having not less than two silicon-bonded hydroxyl or hydrolysable groups that is diluted in an organic based extender or plasticiser and that is formed in accordance with the method of claim 1;
  b. a siloxane and/or silane cross-linker having at least two groups per molecule which are reactable with the hydroxyl or hydrolysable groups in the diluted organopolysiloxane;
  c. one or more fillers; and
  d. a suitable cure catalyst,
wherein the organic based extender or plasticiser is substantially retained within the linear diluted organopolysiloxane and is selected from the group comprising linear or branched mono unsaturated hydrocarbons; and mineral oil fractions comprising linear (n-paraffinic) mineral oils, branched (iso-paraffinic) mineral oils, cyclic (naphthenic) mineral oils, and mixtures thereof.

* * * * *